United States Patent [19]

McKenna et al.

[11] Patent Number: 4,816,904
[45] Date of Patent: * Mar. 28, 1989

[54] TELEVISION AND MARKET RESEARCH DATA COLLECTION SYSTEM AND METHOD

[75] Inventors: William J. McKenna, Barrington; Kenneth W. Silvers, Frankfort, both of Ill.; Rand B. Nickerson, Scarborough; Russell J. Welsh, Toronto, both of Canada; Harold R. Walker, Edison, N.J.; Joseph A. Cullity, Jersey City, N.J.; Bohdan Stryzak, Bridge Water, N.J.

[73] Assignee: Control Data Corporation, Minneapolis, Minn.

[*] Notice: The portion of the term of this patent subsequent to Apr. 14, 2004 has been disclaimed.

[21] Appl. No.: 36,861

[22] Filed: Apr. 10, 1987

Related U.S. Application Data

[63] Continuation of Ser. No. 658,378, Oct. 5, 1984, Pat. No. 4,658,290, which is a continuation-in-part of Ser. No. 559,459, Dec. 8, 1983, Pat. No. 4,546,382, which is a continuation-in-part of Ser. No. 502,654, Jun. 9, 1983, Pat. No. 4,566,030.

[51] Int. Cl.$^4$ ............................................. H04H 9/00
[52] U.S. Cl. ............................................ 358/84; 455/2
[58] Field of Search .................... 358/84, 86; 455/2; 379/92

[56] References Cited

U.S. PATENT DOCUMENTS

| | | | |
|---|---|---|---|
| 4,355,372 | 10/1982 | Johnson et al. | 379/92 |
| 4,498,098 | 2/1985 | Stell . | |
| 4,536,791 | 8/1985 | Campbell et al. | 358/84 X |
| 4,546,382 | 10/1985 | McKenna et al. | 358/84 |
| 4,566,030 | 1/1986 | Nickerson et al. | 379/92 |
| 4,567,511 | 1/1986 | Smith et al. | 358/84 |
| 4,599,611 | 7/1986 | Bowker et al. . | |
| 4,603,232 | 7/1986 | Kurland et al. | 379/92 |
| 4,630,108 | 12/1986 | Gomersall | 358/84 |
| 4,646,145 | 2/1987 | Percy et al. | 358/84 |
| 4,658,290 | 4/1987 | McKenna et al. | 358/84 |

Primary Examiner—Keith E. George
Attorney, Agent, or Firm—Irell & Manella

[57] ABSTRACT

A data gathering system includes a plurality of remote units which are controlled from a central location. Each of the remote units is attached to a television receiver which is generally but not necessarily attached to a cable system. Each of the remote units can function to determine which of several TV modes is in use as well as to store TV channel selector data, data from an optical input device, and/or data input by viewers representative of the composition of the viewing audience. The data is stored for either later collection by a portable data collector, or for direct transmission via telephone to the central location. A video message for a TV viewer, such as a survey, may be transmitted from the central location and stored at the remote units, for later display on the TV receiver associated with the remote units. Substitution of alternate programming information may also be achieved by the central control point on selected of the remote units.

10 Claims, 13 Drawing Sheets

INITIALIZE MEMORY POINTERS

CONNECT UART TO DATAWAND INTERFACE

READ ONE CHARACTER & STORE IN MEMORY

LAST CHARACTER?

RTS

TIME TO OPEN WINDOW?

OPEN WINDOW

TIME TO CLOSE WINDOW?

CLOSE WINDOW

FETCH COMMAND

DECODE COMMAND

COMMAND DISPATCH

BYE COMMAND?

RTS

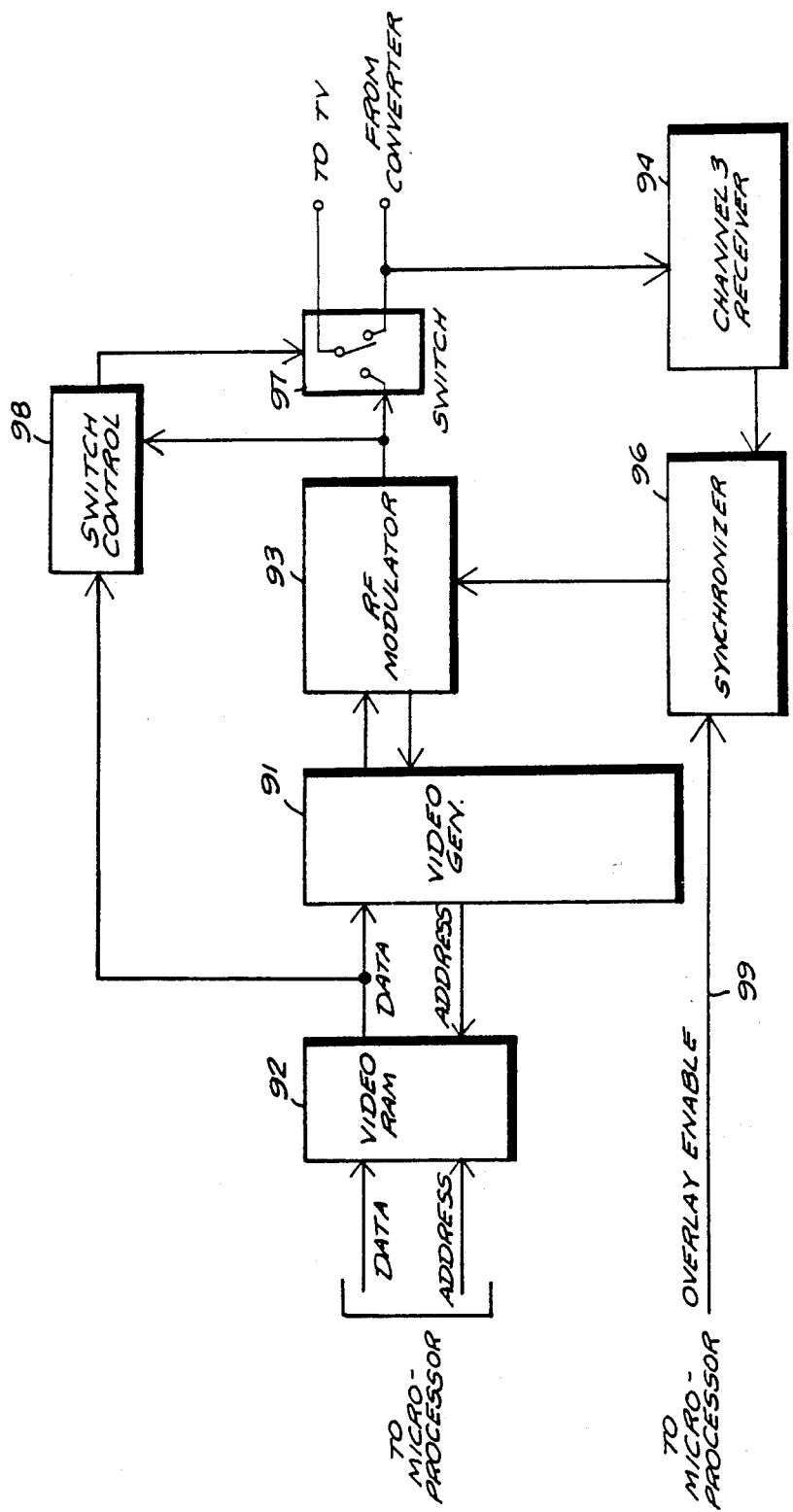

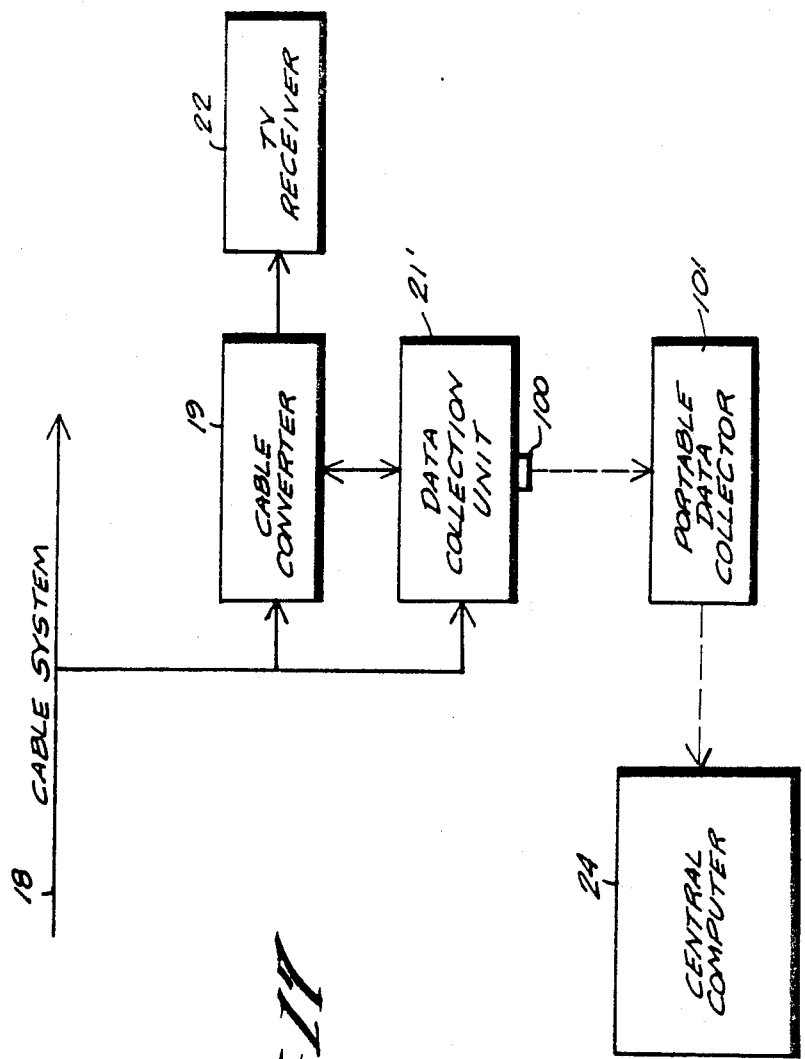

TELEVISION AND MARKET RESEARCH DATA COLLECTION SYSTEM AND METHOD

CROSS REFERENCES TO RELATED APPLICATIONS

The present application is a continuation of application Ser. No. 658,378 filed Oct. 5, 1984, now U.S. Pat. No. 4,658,290, which was a continuation-in-part of application Ser. No. 559,459 filed Dec. 8, 1983, now U.S. Pat. No. 4,546,382, which was a continuation-in-part of application Ser. No. 502,654 filed June 9, 1983, now U.S. Pat. No. 4,566,030.

BACKGROUND OF THE INVENTION

The present invention relates to data storage and transmission systems and more particularly relates to monitoring systems for accumulating data at remote locations and transmitting the data to a central location. More particularly, the present invention relates to a data collection system and method for collecting at remote panelist locations data relative to television viewing habits and preferences as well as product purchases and preferences of a plurality of panelists, and transmitting the collected data to a central location. In accordance with one embodiment of the present invention, a data collection system is provided in which individual television receivers may be controlled from a central location to display substitute programming.

The prior art is replete with various systems and arrangements for monitoring viewing habits of television viewers. The earliest such systems merely collected data on site for eventual manual collection as to the television channels viewed and the times of viewing for various panels of viewers in order to determine market share and ratings of various television programs. Later, systems came into being for use with cable television systems with two way communications over the cable system between the head end thereof and various cable subscribers. In such a system the television sets are typically interrogated periodically from this central location over the cable, with the channel selection and time information being sent back to the central location and logged for statistical compilation. Such systems have also been used in the past in so-called pay television systems in which billing information is sent over the cable system to a central location from the various subscribers to the pay television system. The prior art also includes such systems in which a memory means is provided at the remote location, i.e. at the television receiver, for accumulating data as to the channel being viewed and time. The accumulated data is then periodically transmitted over conventional telephone lines from the remote locations to the central location, by telephone calls initiated by either the remote stations or the central location.

Systems for remotely accumulating data regarding the habits of television viewers and their qualitative reaction to material have today become important from the standpoint of market research. For example, the effectiveness of television commercials can be monitored by correlating viewing of those commercials with subsequent purchase decisions made by panelists whose viewing habits are being monitored. One manner of achieving this which has been utilized in the past is to have the cooperating panelists keep a diary as to purchase of products. The purchase information recorded in these diaries is then correlated with the commercials viewed by those cooperating panelists. In an alternative arrangement disclosed in the prior art, in areas where universal product code automated check-outs are available, such as grocery stores and the like, a panelist makes his or her purchases and at the check-out counter presents a card coded with a unique scanner panelist identification similar to the universal product code symbol on the products purchased. The store's computer can automatically retain such purchase data for subsequent transfer to a market research company computer data base for correlation with the data regarding the various panelists viewing of commercials. Such arrangements of course require cooperation of stores within the area of the panelist locations, and are therefore more suited for limited geographic groupings of panelists in a single locale or city, and are not readily applicable to a national assemblage of panelists extending across an entire country.

In market research relating to commercials and their effectiveness, it also is sometimes important to evaluate the effectiveness of alternative forms of a commercial. One way of achieving this in the context of a cable television system is to split the subscribers or panelists into two or more groups, and then show the alternative forms of commercials to the respective groups of panelists. Correlation of product purchase information regarding those panelists with the forms of the commercials they viewed can then be used to assess the effectiveness of the various alternative forms of the commercial. The prior art also includes examples of systems wherein certain portions of a viewing audience can be selected on a dynamic basis and furnished with substitute programming. Such a system is disclosed, for example, in U.S. Pat. No. 3,639,686 to Walker et al. In accordance with that system, an auxiliary television signal is broadcast which contains not only substitute programming, i.e. video signal information, but also control information such as pulse code information for remotely selecting panelists which are to receive the substitute programming. Digital address information is provided for each of the panelists, and the portion of the panelists which are to receive the substitute programming are selected by the pulse code information. The Walker et al patent notes that in selecting the panelists which are to receive the substitute programming, the number of categories available is dependent on the number of digital information bits that are incorporated in the system. A later U.S. Pat. No. 4,331,974 to Cogswell et al also discloses an arrangement for selecting portions of a viewing audience on a dynamic basis and furnishing those portions with substitute programming.

The present invention relates to an improved system and method which is of particular utility in market research type applications, but which is not limited thereto.

OBJECT AND SUMMARY OF THE INVENTION

It is an object of the present invention to provide a system and method for collecting at remote panelists locations data relative to these panelists, and transmitting the collected data to a central location.

It is another object of the present invention to provide such a data collection system for collecting data relative to panelists television viewing habits and preferences as well as market research data regarding panelists product purchases and preferences.

It is another object of the present invention to provide such a system and method in which the remote locations are provided with memory for storing collected data, with collected data being periodically transmitted to a central location over non-dedicated telephone lines.

It is still another object of the present invention, in accordance with one embodiment, to provide such a system and method in which substitute programming can be provided to selected of the panelists.

Briefly, in accordance with one embodiment of the invention, a remote data collection unit is provided at each of a plurality of panelist locations. The remote unit is adapted to be coupled to one or more television receivers at each panelist location, or to one or more cable television converters in the context of a cable television system. The data collection unit includes a memory and means for monitoring and storing information regarding which of a plurality of television modes are in use, as well as viewer identification data. Means are provided to monitor and store events concerning television viewing, such as channel changes or the like. Further, the data collection unit includes means for optically scanning bar codes and the like and storing information regarding same. Such bar codes and the like can be representative of product purchase information or panelist responses to market research surveys and the like. In one embodiment, telephone communication is periodically established between a central location and each of the remote units, and the contents of each data collection unit memory are transmitted to the central location. Alternatively, a portable memory device can be taken to the location of each data collection unit to transfer the memory content thereof to a tape or disc or other storage device. In accordance with one embodiment of the invention, during telephone communication between the central location and a remote unit, questionnaires can be downloaded from the central location to the memory of a remote data collection unit. Such questionnaires can be displayed on a television receiver coupled to the remote data collection unit, with means provided for a viewer or panelist registering answers to questions in the questionnaire, and the memory of the remote data collection unit storing the answers to the questions for transmission to the central location at the next telephone communication therewith.

In accordance with one aspect of the invention, a viewer control is associated with each remote data collection unit. The viewer control includes a television channel selector, which can be utilized not only in a normal mode for selecting channels but also to place the unit in a channel lock or a non-channel lock position. When the data collection unit is in the channel lock position, the television set associated therewith stays tuned to whatever channel was previously selected, but subsequent changes in the channel selector are stored in the data collection unit memory. This feature is useful for recording data relating to viewer response, individual viewer identification, responses to questionnaires and the like.

In accordance with one embodiment of the invention, substitute programming information may be supplied to each of the panelist locations, as by transmission over an otherwise unused channel in a cable system. Control information is also transmitted along with the substitute programming, with the control information being utilized to select on a dynamic basis portions of the panelists for receipt of substitute programming. The groups of panelists which are to receive the substitute programming information can be selected on a demographic basis or the like.

Other objects, advantages, and features of the present invention will appear from the detailed description of the preferred embodiments thereof, taken in conjunction with the accompanying drawings.

BRIEF DESCRIPTION OF THE DRAWINGS

FIG. 16 is a block diagram relating to an aspect of the invention in which viewer identification prompts are overlayed on the television screen.

FIG. 17 is a block diagram of an alternate embodiment of the present invention in which a portable data collection device is used to retrieve data from data collection units instead of telephone links.

DETAILED DESCRIPTION OF THE PREFERRED EMBODIMENTS

The present invention relates to a data gathering system which includes a plurality of remote units which are controlled from a central location. Each of the remote units is attached to a television receiver which is generally but not necessarily attached to a cable system. Each of the remote units functions to determine which of several TV modes is in use as well as to store TV channel selector data and data from an optical input device. All this data is stored for later transmission by each of the remote units to a central data collecting point. In accordance with some embodiments of the invention, a video message for a TV viewer can be transmitted from the central location and stored at the remote units, for later display on the TV set associated with the remote units. Further embodiments of the invention allow for substitution of alternate programming information by the central control point on selected of the remote units.

Figure 1:
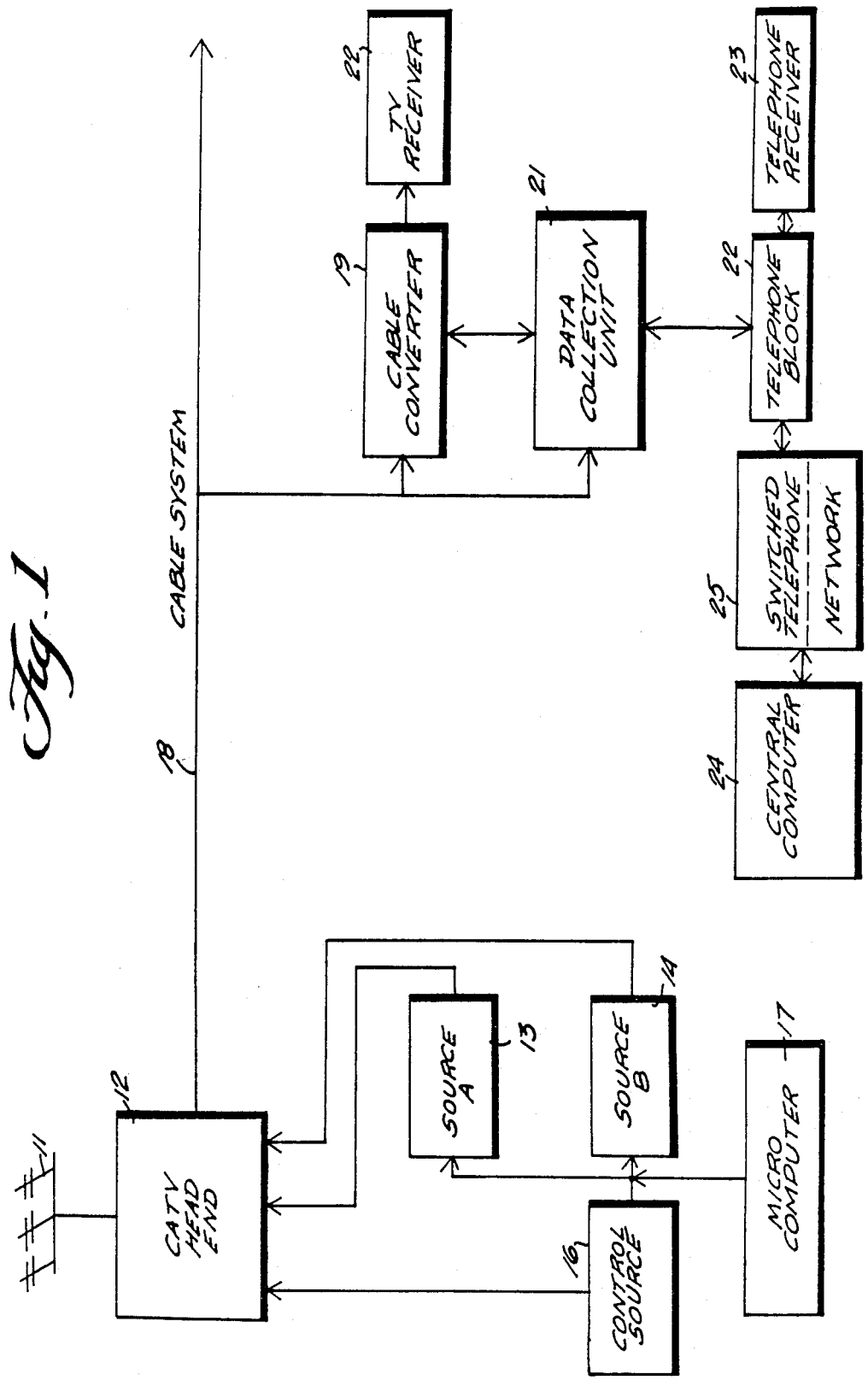
FIG. 1 is a block diagram illustrating an overall system in accordance with the principles of this invention.

Referring to FIG. 1, there is shown a block diagram of the overall system. In accordance with the embodiment shown in FIG. 1, the system is illustrated in the context of a cable TV system; the invention is not necessarily limited thereto, however. In FIG. 1 signals on normal television channels are received by head end antennas 11 associated with a CATV head end control system 12. The signals from the normal television channels can be mixed with videotape or film sources from auxiliary sources 13 and 14. In accordance with the invention, a control source 16 is also provided for transmitting digital data from and under the control of a microcomputer 17. These will be discussed in more detail later.

All of these various signals are mixed in the CATV head end 12 and transmitted over a cable system, generally indicated by reference numeral 18.

FIG. 1 illustrates one of the remote units of this system of this invention, although it should be understood that a plurality of such remote units are provided, suitably situated in homes of panelists or the like who have agreed to serve on panels. As shown in FIG. 1, a cable converter 19 and a data collection unit 21 as provided in accordance with the present invention are both coupled to the cable system 18. A normal television receiver 22 is coupled to the cable converter 19. There is also interconnection for passage of control signals both ways between the data collection unit 21 and the cable converter 19. This is explained in more detail later.

In accordance with the invention, the data collection unit 21 contains a memory, and stores data as to which of a plurality of TV modes are in use, which TV channel is being viewed, as well as input from a suitable optical scanning device, which will be discussed in more detail later. In accordance with some embodiments of the present invention, other data can be collected by the data collection unit, such as viewer qualitative rating of programs and responses to survey questionnaires and the like.

The data collection unit 21 is interconnected to a telephone block 22, through which incoming and outgoing telephone calls are coupled to the panelist's home with suitable wiring and the like interconnecting telephone receivers 23 in the panelist's home.

A central data collection point is provided for the system in accordance with this invention, which need not be the same central location as the CATV head end 12. The central location is indicated in FIG. 1 by the central computer 24. The central location can include an appropriate computer with modems and the like for making connection over the switched telephone network 25 to each of the remote locations. This is illustrated in FIG. 1 by the connection between the switched telephone network 25 and the telephone block 22 for the particular remote location shown in FIG. 1. Periodically, the central computer 24 "dials-up" each of the remote locations, establishes appropriate telephone communications with each of the data collection units 21, and the data stored in each of the data collection units 21 is transmitted via the switched telephone network 25 to the central computer 24. While in telephone communication, in addition to extracting the stored data from the data collection unit 21, the central computer 24 can also download via the telephone lines data into each of the data collection units 21, as discussed in more detail hereafter. Also as discussed in more detail hereafter, in accordance with one aspect and embodiment of the invention, appropriate interconnections are provided in the telephone block 22 so that when a telephone call comes in from the central computer 24, the call is routed to the data collection unit 21, and does not activate the telephone receivers 23 in the panelist's home.

Figure 2:
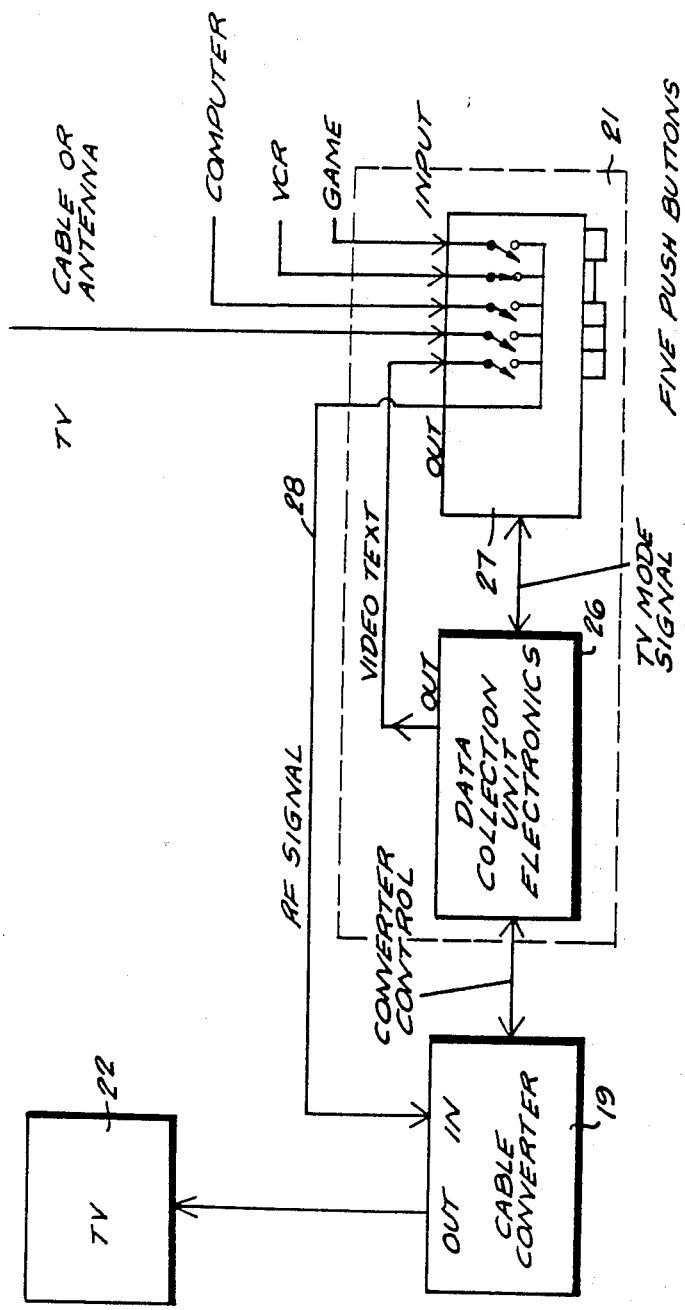
FIG. 2 is a block diagram illustrating signal flow in accordance with the present invention.

Referring now to FIG. 2, there is shown an additional block diagram illustrating signal paths between the data collection unit 21, the cable converter 19, and a television receiver 22. Referring to FIG. 2, the data collection unit 21 includes an electronics portion 26 and a switching portion 27. The switching portion 27 consists of a number of switches, five in the embodiment shown in FIG. 2, for selecting which of a variety of TV modes are to be utilized. Thus, for example in the embodiment shown in FIG. 2 the inputs to the switching portion 27 are the normal TV signal from a cable or antenna, along with an interconnection to a computer, i.e. home computer, a VCR, and a game. Depression of one of the five pushbuttons in the switching portion by a viewer or panelist selects one or the other of these TV modes. A TV mode signal corresponding to and indicative of one of these TV modes is stored in the data collection unit electronics section 26. As was briefly discussed in connection with the block diagram of FIG. 1, in accordance with one embodiment of the invention text information, such as survey quastionnaires and the like, can be downloaded from a central location over the telephone lines and stored in the data collection unit electronics 26. Selection of a "survey" function by the panelists, actuates this TV mode and video text information is coupled through the corresponding switch in the switching portion 27 and coupled over RF signal line 28 to the input of the cable converter 19. The output of the cable converter 19 is of course suitably connected to the television receiver 22.

In accordance with the present invention, control information is coupled both ways between the cable converter 19 and the data collection unit 26. In fact, in accordance with the present invention, and as described more fully hereinafter, it is the data collection unit electronics 26 which controls the television program material displayed on the television receiver 22, rather than the cable converter 19.

Figure 3:
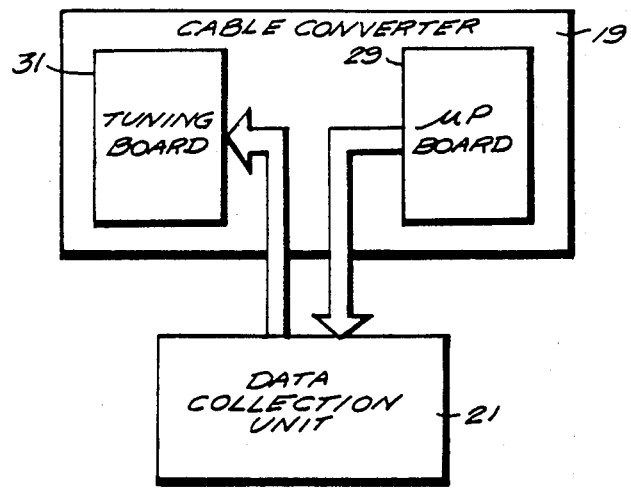
FIG. 3 is a block diagram illustrating modification of a cable converter in accordance with the present invention.

Referring to FIG. 3, there is shown a typical example of the way in which cable converters are modified in accordance with the present invention for application of the present invention thereto. Cable converters typically include a microprocessor section illustrated in FIG. 3 by reference numeral 29 and a tuning section illustrated in FIG. 3 by reference numeral 31. For example, the Teknika 6401 cable converter includes such an arrangement, and a ribbon cable is normally supplied connecting the microprocessor board 29 to the tuning section 31. Typically, the microprocessor section controls a digital display and television receiver commands are received from a front panel on the cable converter, or a remote control as well know in the art. The microprocessor section sends commands to the tuning section via the ribbon cable normally connecting the two. In accordance with the present invention, the ribbon cable from the microprocessor board or section is interrupted and is connected to the data collection unit 21. The commands and the like from the microprocessor section 29 are interpreted by the data collection unit 21, which then in turn controls selection of a channel by the tuning section or board 31. As discussed more fully hereafter, the data collection unit 21 will normally cause the tuning section 31 to select and display whatever channel was indicated in the command information from the microprocessor section 29. However, when the present invention is in a substitute programming functions the data collection unit 21 will or can substitute programming, i.e. select a channel for display other than the channel indicated by the commands from the microprocessor board 29, for display at the television receiver. Also, the interconnection between the data collection unit 21 and the cable converter enables the data collection unit 21 to store information as to the channel being viewed and at what times, etc.

Figure 4:
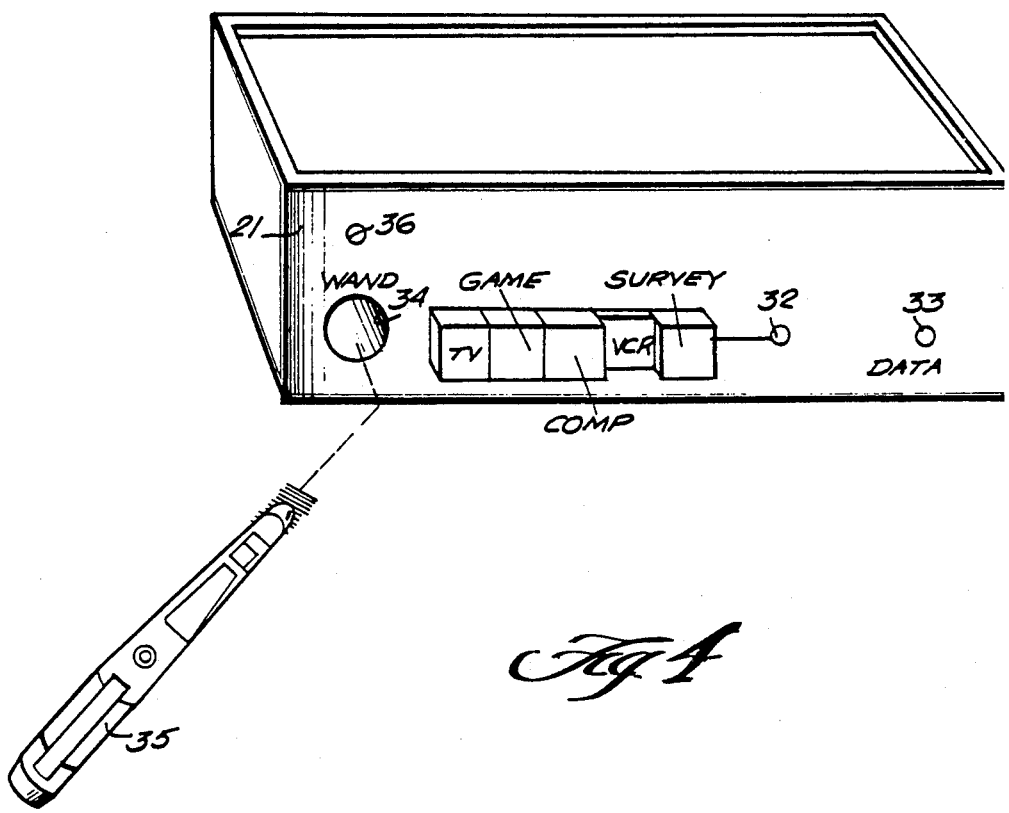
FIG. 4 illustrates the mode switches and data wand of a data collection unit in accordance with the present invention.

Turning now to FIG. 4, there is shown a representation of the physical appearance of the data collection unit 21 in accordance with the present invention. The unit is preferably dimensioned such that a cable converter, such as the Teknika 6401 converter will sit right on top of the data collection unit. As illustrated in FIG. 4, five TV mode selector switches are provided in the form of pushbutton switches. These correspond to TV, game, computer, VCR, and survey. As mentioned previously, in accordance with one aspect of the invention survey questionnaires and the like can be downloaded from the central location over the telephone lines to memory in the data collection unit. Selection of the survey pushbutton switch in the data collection unit will then cause the survey questionnaire to be displayed on the television screen at the viewer's or panelist's convenience, for recording of answers to the questionnaire by the panelists. The manner in which these responses to the questionnaires are registered and stored is discussed hereinafter. However, as illustrated in FIG. 4, a light emitting diode 32 is provided on the front panel of the data collection unit in association with the survey pushbutton. When survey questionnaires are contained in the memory of the data collection unit and have not been responded to by the panelists, the light emitting diode 32 is lit in a manner discussed hereafter, so as to inform the panelists that there is an unanswered questionnaire. An additional data light emitting diode 33 is provided on the front panel of the data collection unit and provides further communication with a panelist, as discussed in detail hereafter.

Also shown in FIG. 4 is a receptacle 34 provided in the front panel of the data collection unit. The receptacle 34 is adapted to receive a data wand 35, and an additional light emitting diode 36 is provided on the front panel of the data collection unit for displaying indications relative to the data wand. The data wand 35 is an optical scanning device which contains its own internal memory. The data wand 35 can be used for scanning bar codes, such as the UPC codes found on products, and storing information relative to those bar codes. The data stored within the data wand 35 can be periodically transmitted to memory within the data collection unit, by inserting the data wand 35 into the receptacle 34.

A suitable example of an optical scanning device 35 for recording bar codes is that manufactured by MSI Corporation and sold under the trademark "DATA WAND." The MSI data wand is available with an RS-232C-type standard interface, which is incorporated into the data collection unit 21 in accordance with the present invention. This interface allows connection to the computer and memory provided in the data collection unit, as discussed more fully hereafter.

Figure 5:
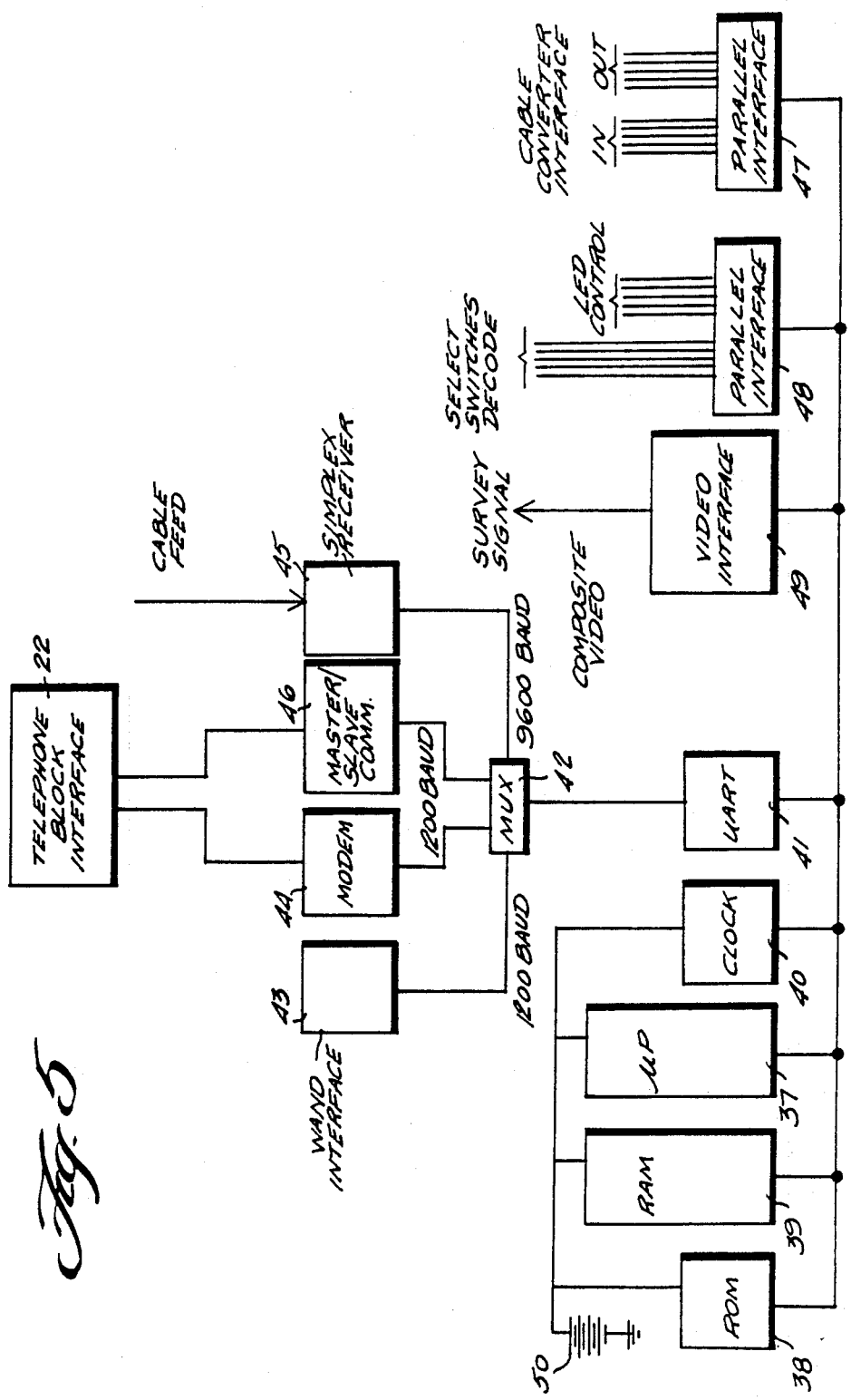
FIG. 5 is a detailed block diagram of a data collection unit in accordance with the present invention.

Referring now to FIG. 5, there is shown a functional block diagram of a data collection unit in accordance with the present invention. The heart of the data collection unit is a microprocessor 37 and suitable programming for the microprocessor is contained in a ROM 38. Details of the programming
.17 are discussed hereafter. A RAM 39 is also provided for storing event information such as channel selection, TV mode selection, data read by the optical scanner 35 and the like. A clock 40 is also provided to run the microprocessor 37, with the clock 40 also functioning to maintain a time of day indication for recording times in connection with events in the RAM 39. The RAM 39 typically is provided with 32k bytes storage. Also typically, 8k bytes of ROM is provided.

The data collection unit contains a serial line driver 41, which is appropriately selected to be one of those available which has a programmable baud rate. This serial line driver 41 is connected via a multiplexer 42 to a variety of interfaces. First, a wand interface 43 is provided for accepting data from the optical scanner 35. As discussed previously, the wand interface provided with the MSI data wand has a standard RS-232 output at a 1200 baud rate. Another input to the multiplexer 42 is a modem 44 contained within the data collection unit. The modem 44 is a Bell 202 compatible, half duplex modem with an auto answer capability. This modem 44 is coupled to the telephone block interface 22, which is described in more detail hereafter. The data transfer rate via the modem 44 is also 1200 baud.

The data collection unit also contains a receive only interface, shown as simplex receiver 45 in FIG. 5 which receives an input from the cable system. This simplex channel uses an FM carrier on the cable and originates as a broadcast from the CATV head end. As more fully discussed hereafter in connection with a discussion of the substitute programming aspect of this invention, certain control information is transmitted to the remote data collection units via this cable simplex channel. The transmission speed of this channel in accordance with one embodiment is 9600 baud.

A master/slave communication block 46 is shown in FIG. 5 as coupled to the telephone block interface 22. This master/slave communication block is only applicable where a plurality of television sets are provided in one panelist's home. The specific functioning of the master/slave relationship is described hereafter in connection with FIG. 6.

A parallel interface 47 is provided for providing the interface between the data collection unit and the cable converter. Thus the inputs and outputs of this parallel interface are from the microprocessor in the cable converter and to the tuning section of the cable converter (see FIG. 3).

A parallel interface 48 is also provided for decoding the mode or function select switches provided on the front panel of the data collection unit (see FIG. 4) and for controlling the three light emitting diodes 32, 33 and 36 on the front panel of the data collection unit.

A video interface 49 is provided for providing video output information to the television receiver through the cable converter to display survey questionnaires and the like on the television receiver when the survey mode is selected. As mentioned previously, in accordance with one aspect of this invention survey questionnaires can be downloaded over the telephone lines from the central location to the remote units while they are in telephone communication. The survey questionnaires are stored in RAM 39 and light emitting diode 32 is lit on the front panel of the data collection unit to inform the panelists that there is an unanswered questionnaire. When the panelist selects the survey function, the video interface 49 produces a composite video signal for display on the television receiver to display the questions in the questionnaire.

A battery 50 is also shown in the functional block diagram of FIG. 5. Although normal power connection for powering the data collection units is via the normal household power supply, a battery backup can be provided to ensure that the data collection unit remains powered up during any temporary power outages at the panelist's home, so as not to lose current time of day information in the clock 40 or any of the data stored in the RAM 39.

All of the circuitry functionally illustrated in the block diagram of FIG. 5, with the exception of the master slave communications 46 and the telephone block interface 22, can be any appropriate integrated circuits or the like which are available on the market for the functions indicated.

An important aspect of the data collection unit in accordance with the present invention is its interface to the cable converter. Specifically, it is the data collection unit itself which controls the tuning of the cable converter. The viewer or panelist appears to control the cable converter normally, but the signals are actually intercepted by the data collection unit and it is the data collection unit that commands the tuning of the converter, as has been described above in connection with FIGS. 2 and 3. During most television viewing activity, the data collection unit will command the tuner to select the same channel that the viewer has selected. However, when in functions which are described as "Channel-Lock" and during "Dynamic Allocation", the data collection unit will select channels other than the one being displayed.

Channel Lock is a data collection unit function in which the cable converter remains locked on one channel regardless of the activity occurring with the converter control and the channel number being digitally displayed on the cable converter. Channel Lock is entered by selecting an unoccupied converter channel, such as channel 35. When the data collection unit decodes channel 35, it will freeze the converter on the channel previously selected nd illuminate light emitting diode 33 on the front panel of the data collection unit (see FIG. 4). The viewer or panelist can now use the converter control to display any channel number on the converter without changing the channel being viewed. The data collection unit will collect events, as in the normal viewing mode, including storing the subsequent channels selected during the Channel Lock condition as events. Each time the data collection unit collects events the light emitting diode 33 will be blinked off, corresponding to an indication that an event has been captured by the data collection unit. This Channel Lock feature is useful from a number of standpoints. For example, when in a Channel Lock condition the viewer could select various channels for entry as events with the various channel numbers selected corresponding to the viewers qualitative reaction to programming. As another example, a particular channel number could be entered while in the Channel Lock condition which corresponds to the identification of particular individuals who are viewing the program within the household. A particular embodiment of identifying viewers is described hereafter in connection with FIG. 16. Likewise, selection of channel numbers while in a Channel Lock condition is useful in connection with responding to survey questionnaires and the like, which is described more fully later. A key feature of the present invention is that entry of such qualitative viewer reaction data and the like is achieved while being able to use the normal channel selector associated with the cable converter, rather than any kind of separate key pad or other data entry device. The "Channel-Lock" condition is exited by selecting an unoccupied converter channel, such as 36, at which time the light emitting diode 33 is extinguished and normal tuning of the converter is resumed.

As has been previously described, the select switches or mode switches provided on the front panel of the data collection unit (see FIG. 4) allows the viewer to select one of a number of alternate signal sources. For example, these possible alternative signal sources are TV (either cable or air), VCR, game, computer and survey. The switches as shown in FIG. 2 select one of the signal sources and route it to the input of the cable converter. The data collection unit monitors the switch selection and controls the converter tuning accordingly. If TV viewing is selected, then normal converter operation is enabled. If one of the other four sources are selected, the data collection unit will record an event and tune the converter to the appropriate channel to tune the signals which are selected. For example, the game and VCR output may be on channel 3, while the computer output is on channel 10. These are specific parameters that can be adjusted with respect to any particular installation.

Dynamic allocation is a term used to describe the concept of blind or invisible channel substitution. As described earlier, U.S. Pat. No. 3,639,686 to Walker et al relates to such a dynamic allocation or substitute programming kind of system. In accordance with one embodiment of the present invention, a substitute programming arrangement in accordance with the principles of the Walker et al patent is incorporated. Basically, the dynamic allocation process is one in which one or more channels in selected households are substituted with another test channel by the data collection unit.

The materials substituted usually are commercials, for purposes of market research with respect to the efficacy of commercials. In practice, a set of substitute commercial cut-ins are scheduled each day. For example, each cut-in can be assigned a two digit number. For each cut-in, a channel remap table is loaded into the data collection unit. The remap tables are simple and consist, for example, of one or more channel numbers and the channel they are to be remapped to. At any given time, the memory in the data collection unit can hold a number of such remap tables. In accordance with one embodiment of the invention, the remap tables are downloaded over the cable channel and received by the simplex receiver 45 (FIG. 5).

Each data collection unit has an identification number. There can either be unique identification numbers for each data collection unit corresponding to each panelist location, or panelists can be grouped in accordance with demographic considerations and assigned a common identification number. Identification numbers for each data control unit can be downloaded to the unit from the central location during telephone communications between same.

Since the messages transmitted on the simplex channel over the cable are received by all data collection units, they must be addressed to particular data collection units-or groups of data collection units and be appropriately formatted with message delimiters and the data collection unit identification numbers. As discussed above, the dynamic allocation remap tables are downloaded over the cable channel and received by the simplex receiver 45 at each of the data collection units. These remap tables are stored in RAM 39. A remap table is enabled, during the cut-in, by continually transmitting the cut-in number down the cable to the simplex communication channel. Whenever a data collection unit receives a cut-in number, the particular remap table is enabled for some predetermined time, i.e. 0.5 seconds. When the remap table is enabled for a particular data collection unit, the data collection unit automatically provides substitute programming as indicated by the remap table to the television receiver of the panelist. This alternate programming is transmitted from the cable head and down channels normally not used for entertainment.

This dynamic allocation feature facilitates market research. By displaying alternate forms of a commercial to different groups of panelists, and correlating that display both with the demographic data concerning the panelists and the product purchases by the panelists, the efficacy of the commercials can be evaluated.

In accordance with one embodiment of the present invention correlation of panelist viewing activity as to commercials and the like with product purchases made by the panelist has been greatly facilitated. The earliest market research techniques relied upon a panelist filling out a purchase diary or the like with this information then being manually collected by the market research organization for correlation with viewing activity of that particular panelist. Systems have been proposed in which viewing activity of a panelist is correlated with product purchase information with respect to that panelist by monitoring at stores within a limited geographic area surrounding the panelists the product purchase information with respect to that panelist. Specifically, each panelist has an identification card presented at a grocery store at the like which uses check out counters having the facility for optically reading universal product codes on products. When the panelist makes purchases, the identification of that panelist is scanned into the computer at the store, along with the product purchase information with respect to that panelist. This information is either coupled from the store's computers to the market research organization, or collected at a later time from the stores by the market research organization.

For certain market research activities, it might be desirable to have a national group of panelists, spread across the geographic extent of the United States or whatever other country that is the subject of the market research. For such an arrangement, it would not really be feasible for the market research organization to have arrangements with and be tied into the computers of stores spread all across the country. Therefore, in accordance with one aspect of the present invention, collection of information regarding product purchases by a panelist has been greatly facilitated.

As described in connection with FIG. 4, the data collection unit in accordance with this one aspect is equipped with an optical scanner, one suitable example of which is a product known as the MSI data wand. This is a hand held device that contains an internal memory and can be used for scanning bar codes, such as universal product codes, contained on products purchased by a panelist. Thus, in accordance with this one aspect of the present invention, product purchase information with respect to a particular panelist is easily collected by the panelist simply scanning the data wand over the universal product codes on the products purchased by the panelist. The MSI data wand has an internal memory which can store approximately 4,000 digits. This memory is of a sufficient extent to store the product code and a price for about 300 items, which should be adequate for recording the daily purchases for a household. After scanning products with the data wand, the data wand can be inserted into the receptacle in the front panel of the data collection unit and the memory contents of the data wand transferred to memory within the data collection unit. As explained previously, the MSI data wand can be obtained with an RS-232 interface for this purpose, which interface is incorporated within the data collection unit. The procedure for transferring the data wand information into the data collection unit is as follows. The panelist turns on the cable converter, enters the channel lock condition, and then selects an unused channel, such as 34, which is programmed to instruct the data collection unit to monitor the interface with the data wand. The panelist then scans the data wand over a special code that is provided with the data wand which instructs the data wand to transmit data. The data wand is then inserted into the holder or receptacle within the data collection unit. After the data has been received and verified by the data collection unit, the light emitting diode 36 (see FIG. 4) provided on the front panel of the data collection unit will blink off and on for five seconds, so as to inform the panelist that the operation has been successfully completed. Then, the panelist extracts the wand from the data collection unit, clears the wand memory in accordance with features provided in the data wand, and reinserts the data wand into the data collection unit for storage in the receptacle.

Subsequently, when telephone communication is established between the central location and the individual data collection units at the various panelists homes, the stored product purchase information with respect to the various panelists is transferred from memory of the data collection unit to the central location. This greatly facilitates collection of such product purchase data with respect to individual panelists, and correspondingly facilitates correlation thereof with viewing activity of those panelists. Using such an arrangement, a nationwide group of panelists scattered over a wide geographic area is practical.

As has been previously mentioned, when a particular data collection unit is in contact with the central location, a survey questionnaire or the like may be downloaded over the telephone lines into memory of the data collection unit. Whenever the data collection unit contains an unanswered questionnaire, the data collection unit will illuminate the survey light emitting diode 32 on the front panel of the data collection unit so as to inform a panelist that the data collection unit contains a survey which has not been answered. Anytime that this light emitting diode 32 is illuminated, the panelist may elect to turn on the television and depress the survey select mode select switch on the front panel of the data collection unit. The data collection unit will detect depression of the survey select switch, illuminate the data light emitting diode 33, tune the cable converter to the appropriate channel, and output the first question to the television through the video interface 49 (FIG. 5). The converter is automatically placed in a channel lock condition at this time by the data collection unit. The viewer can thus use the converter control or channel selector to enter channel numbers to answer whatever questions are presented in the questionnaire. For example, a questionnaire might ask a question and give five possible responses, with a number beside each of the possible responses. The panelist enters a channel number corresponding to the number adjacent the answer the panelist is giving to the question. When all the questions have been answered by the panelist, the data light emitting diode 33 on the front panel of the data collection unit will be extinguished. When the panelist then depresses another mode select switch, the survey light emitting diode 32 will also be extinguished.

Figure 6:
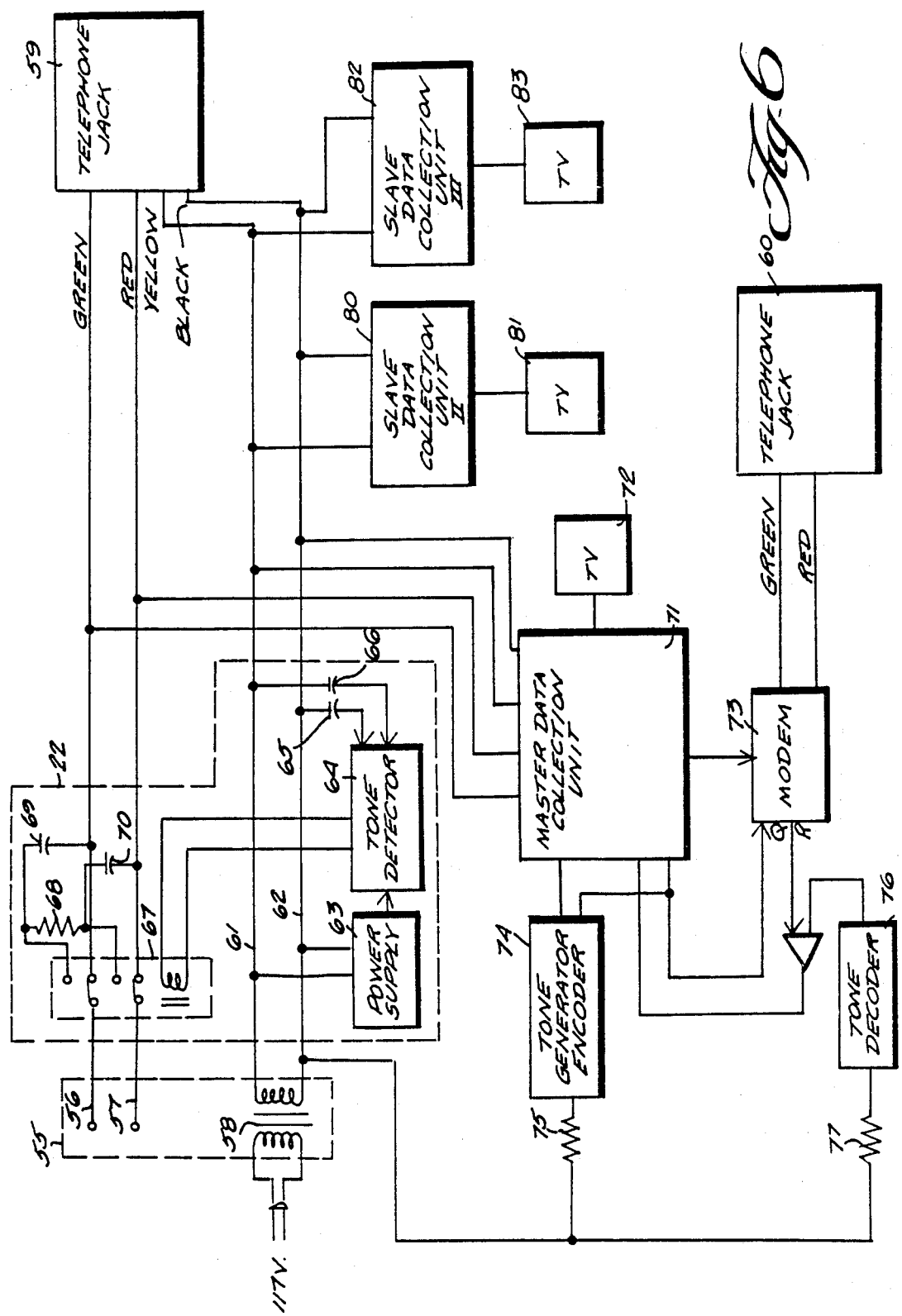
FIG. 6 is a block diagram of the telephone block interface and master/slave coupling in accordance with one embodiment of the invention.

As has been described previously, the transfer of data from the remote data collection units to the central location is achieved in one embodiment by telephone communications over the switched telephone network between the central location in each of the various remote units. Also, situations arise in which there is more than one television receiver within a single panelist's home, and some means is necessary to collect viewer data and the like with respect to each of the television sets, and store and communicate that data to the central location at an appropriate time. Referring now to FIG. 6, there is shown one embodiment of the invention which illustrates the manner of effecting telephone communications from a remote location or panelist's home to the central location, and also the situation in which there is more than one television receiver in a single panelist's home which have to be monitored.

Referring now to FIG. 6, there is illustrated a telephone block generally indicated by reference numeral 55. At each building or house there is a point at which telephone service enters the building which is referred to as the telephone "block." This block includes terminals for the telephone lines 56 and 57 and may also contain several other devices to protect telephone line service, such as lightening arresters and voltage limiters (not shown). Typically, the telephone block also contains a low voltage transformer indicated by reference numeral 58 which is used to supply lighting power to the telephone. In accordance with standard color coding, the telephone lines 56 and 57 are respectively green and red and extend to a number of telephone jacks, two of which 59 and 60 are illustrated in FIG. 6. Two signal lines 61 and 62 from the low voltage transformer 58 also extend to the various telephone jacks and are color coded yellow and black, respectively.

In accordance with the present invention, a telephone block interface 22 is provided at the point of the telephone block within a building. This telephone block 22 is interfaced to the telephone lines 56 and 57 as well as the low voltage power lines 61 and 62. Low voltage from the transformer 68 is used to supply power via a power supply 63 to a tone detector 64. This tone detector 64 is a low energy detector used to detect the presence of a control tone, for example a 150 KHz signal which can be imposed on the low voltage lines 61 and 62, in a manner discussed hereafter. Thus the tone detector 64 is connected to the power lines 61 and 62 via coupling capacitors 65 and 66. The tone detector 64 is coupled to and controls a relay 67 which is actuated between the position shown in FIG. 6, wherein the telephone lines 56 and 57 are not interrupted, to a position where the telephone lines 56 and 57 are coupled through a load resistor 68 and capacitors 69 and 70.

In FIG. 6 there is shown a master data collection unit 71 which is typically connected to a television receiver 72. Provided as part of the master data collection unit 71 is a modem 73, which as discussed previously can be a standard kind of modem, such as an auto-answer Bell 202 modem. This is a 1200 baud, half-duplex device. The modem 73 in accordance with this invention is also connected to a telephone jack, for connection to the telephone lines 56 and 57.

A tone generator-encoder 74 is coupled to the master data collection unit 71 and through a resistor 75 to one of the power lines 61 and 62. Similarly, a tone decoder 76 is also coupled through a load resistor 77 to one of the signal lines 61 and 62 and through an amplifier 78 to the master data collection unit 71.

In operation, the master data collection unit 71 will enable the modem 73 for a limited period of time or "window" each day. Typically, a call-in window of a two hour duration will be opened once per day at a time when the telephone system is normally not in use, i.e. 4-6 a.m. in the morning. During this time window, the master data collection unit 71 will answer each incoming telephone call, and quickly determine if the call originates from the central location. The manner in which this is done is as follows.

During the call in window, a ring signal occurring at the telephone block 55 is a signal of about 45 volts at 25 Hz. This is impressed across the telephone signal lines 56 and 57, and would normally cause telephone sets connected to the telephone service to ring. However, the master data collection unit 71 samples the first half cycle of any incoming signal during the call in window for voltage and pulse duration. If the microprocessor within the master data collection unit 71 determines the signal is a ring signal, the tone generator encoder 74 is caused by the data collection unit 71 to impress a 150 KHz tone on the low voltage lines 61 and 62. In response to this tone, the tone detector 64 actuates the relay 67. With the relay 67 actuated, the remainder of the ring signal is absorbed by the load resistor 68. Since lad resistor 68 is sufficiently low in value to indicate to the telephone system that a connect has been made, there will be no further rings.

The modem 73 is a standard telephone modem well known to those skilled in the art. This modem is caused by the microprocessor within the master data collection unit 71 to send a two to four second tone, such as a 380 Hz side tone, back to the calling source via the telephone lines 56 and 57 and the coupling capacitors 69 and 70. If the calling source is in fact the computer at the central location, the computer at the central location will respond with an answering tone, and two way computer-to-computer conversation will be established. If, on the other hand, there is no answering tone from the source of the telephone call, indicative that the calling party is not the central location computer, the data collection unit 71 removes the 150 KHz carrier tone on the low voltage leads 61 and 62, causing a disconnect.

If the call coming in during the call in window is in fact not the central computer, but a normal telephone caller, the telephone caller would hear the side tone and the disconnect, and a dial tone would be returned. If such a call comes in and a disconnect occurs, the data collection unit 71 is programmed to disable the tone generator encoder 74 for a predetermined period of time, such as twenty minutes. Thus, any calls coming in during this next predetermined time period of twenty minutes or the like would cause normal telephone ringing. The caller, having been disconnected, would then be able to dial his call again, this time with success. Inasmuch as the sequence of events occurs outside of normal telephone usage hours, it is not believed that such a sequence of events represent any serious impairment to normal telephone usage.

If it is determined that the calling source is the central computer, so that computer-to-computer communication is established, upon establishment of that communication the central computer, under appropriate programming, calls on the master data collection unit for the information stored during the day. Upon receiving this information, the central location may cause a new program to be loaded into the data collection unit 71 memory, such as a questionnaire or the like as discussed previously. If the master data collection unit 71 is the only data collection unit to be communicated with by the central location, the central computer upon completion of receiving the stored information and loading any new program information into the master data collection unit 71 simply disconnects, and all circuits return to normal.

Referring to FIG. 6, one embodiment of the invention is also illustrated in which there are multiple television receivers within a single panelist's home which must be monitored. As illustrated in FIG. 6, two additional television receivers 81 and 83 might exist in a panelist's home, and slave data collection units 80 and 82 are associated therewith as illustrated in FIG. 6. These slave data collection units 80 and 82 are coupled to the low voltage lines 61 and 62. Thus, the slave data collection units can be connected to any of the various telephone jacks within the panelist's house, and coupling to the master data collection unit and the other circuitry is by means of the existing telephone wiring within the household. In accordance with one embodiment of the invention, all signals received from the central location via the modem 73 are sent first to the master data collection unit 71, then echoed via the tone generator 74 to the signal lines 61 and 62 so that the slave data collection units 80 and 82 receive the incoming data. Tone generator 74 generates a multiplicity of tones to keep the relay 67 closed, plus an additional variable frequency tone representing the data being transmitted. These tones range, for example, from a 150 KHz to 350 KHz and are impressed as carrier currents on the signal lines 61 and 62. Each of the slave data collection units contains a microprocessor and would require a tone generator and tone decoder similar to the tone generator 74 and tone decoder 76, but would not require any separate modem. Each of the slave data collection units receives the identical data to the master data collection unit 71. By addressing the data stream, the slave data collection units can be caused to act independently. When a slave data collection unit is called upon to respond, so as to transmit data stored in the slave data collection units the carrier current signal impressed on the low voltage lines 61 and 62 reverses direction, the tone decoder 76 receives the signal from the slave data collection unit, decodes it into standard data which is then echoed by the master data collection unit 71 through the modem 73 to the central location.

In the manner described above, each of the data collection units, which are coupled together via the existing telephone wiring in a panelist's home, receives all of the incoming information from the central location, and can be caused to respond independently to transmit data stored in each of the data collection units back to the telephone lines to the central location. Of course, other variations are possible. For example, at a preset programmed time programmed into the microprocessor of the master data collection unit 71, the master data collection unit can poll each of the slave data collection units by carrier current over the low voltage telephone wiring 61 and 62 to collect the available data at each of the slave data collection units, addressing each of these slave data collection units seriatum by code as necessary. Thus, all of the data from all of the various data collection units within a panelist's home would be stored in the master data collection unit. Then, upon contact of the master data collection unit 71 with the central location, the central location would obtain the data by simply contacting the master data collection unit. Similarly, the central location would load the master data collection unit with any new programs, such as questionnaires and the like, which are to be stored in memory at the various data collection units. Then, when the central location disconnected the telephone connection with the master data collection unit 71, the master data collection unit can then relay the new programs to the slave data collection units, addressing each by code as necessary.

Thus, in accordance with the above described arrangement and as illustrated in FIG. 6, a plurality of data collection units can be provided within a single panelist's home associated with a respective different plurality of television receivers, for monitoring each of the television receivers in the same fashion as a single data collection unit is provided to monitor one single television receiver. Although the various slave data collection units have been shown as coupled to the master data collection unit through the existing telephone wiring in a panelist's home, it should be clear that existing power wiring within a panelist's home can also be used for the same function. That is, carrier signals can be impressed upon the power wiring within a panelist's home for transferring data to and from various slave data collection units to the master data collection unit. Of course, as a further alternative, dedicated wiring could be installed in a panelist's home for connecting the various slave data collection units to the master data collection unit.

Figure 7:
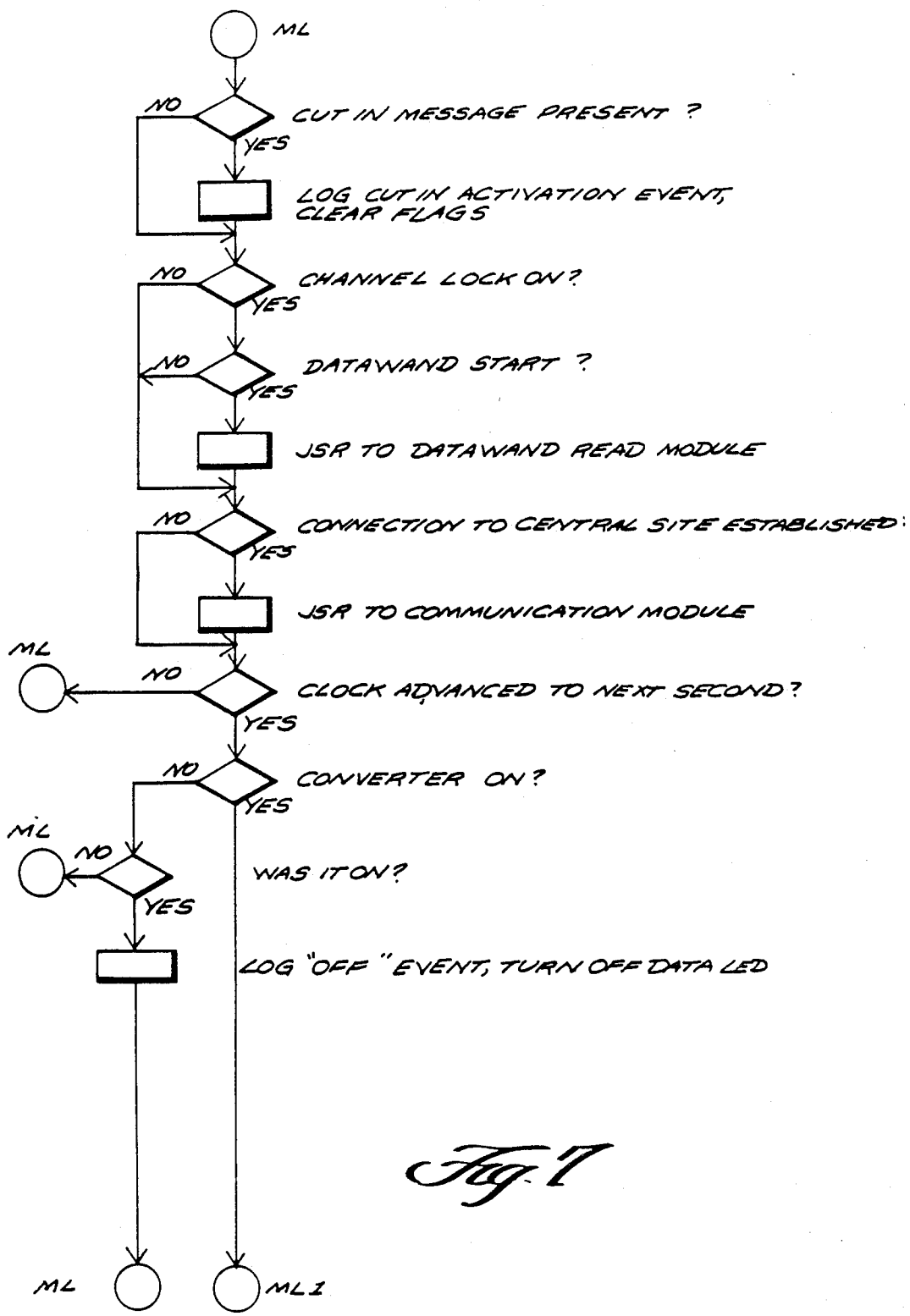
FIG. 7 is a logic flow diagram of the main loop of a data collection unit in accordance with the present invention.

Turning now to FIG. 7, there is shown a logic flow diagram for the software controlling the main loop (ML) of the microprocessor within the data control unit. The first decision block is as to whether or not there is a cut-in message present. It will be recalled as discussed previously that remap tables for achieving dynamic allocation or substitute programming are stored in the memory of the data collection units and are enabled by transmission of a cut-in number down the cable. If there is a cut-in message present, the cut-in activation event is logged, and all flags in the system are cleared. If there is no cut-in message present, then the logic flow is to the next decision block as to whether or not the channel lock is on. If the channel lock is on, the next decision block is to whether or not a data wand start condition exists. If a data wand start condition exists, the logic flow is jump subroutine (JSR) to data wand read module. The no conditions to the decision block for the channel lock on and data wand start lead to a decision block s to whether or not connection to central site is established. If it is, the next block is a jump subroutine (JSR) to communication module. If connection to central cite is not established, then the next decision block is to whether or not the clock is advanced to the next second. If it is not advanced to the next second, the logic flow is back to the upper portion of the main loop (ML). If the clock is advanced to the next second, the next decision block is to whether or not the converter is on. If the converter is on, the logic flow progresses to a main loop 1 (ML1). If the converter is not on, the next decision block is to whether or not the converter was on. If it was not, the logic flow is back through the main loop ML. If the converter was on, then the next decision block is to log an off event, and turn off the data light emitting diode (light emitting diode 33 in FIG. 4). The timing of the lower portion of the logic flow diagram indicated in FIG. 7 i.e. as to whether the converter is on, is executed once per second in accordance with the programming. Other aspects of subroutines, such as the converter control subroutine discussed hereafter, are interrupt driven and operate asynchronously to the bottom portion of the ML loop in FIG. 7. Components of the data collection unit system which are interrupt driven pass flags and values to this main loop ML for logging and dispatching.

Figure 8:
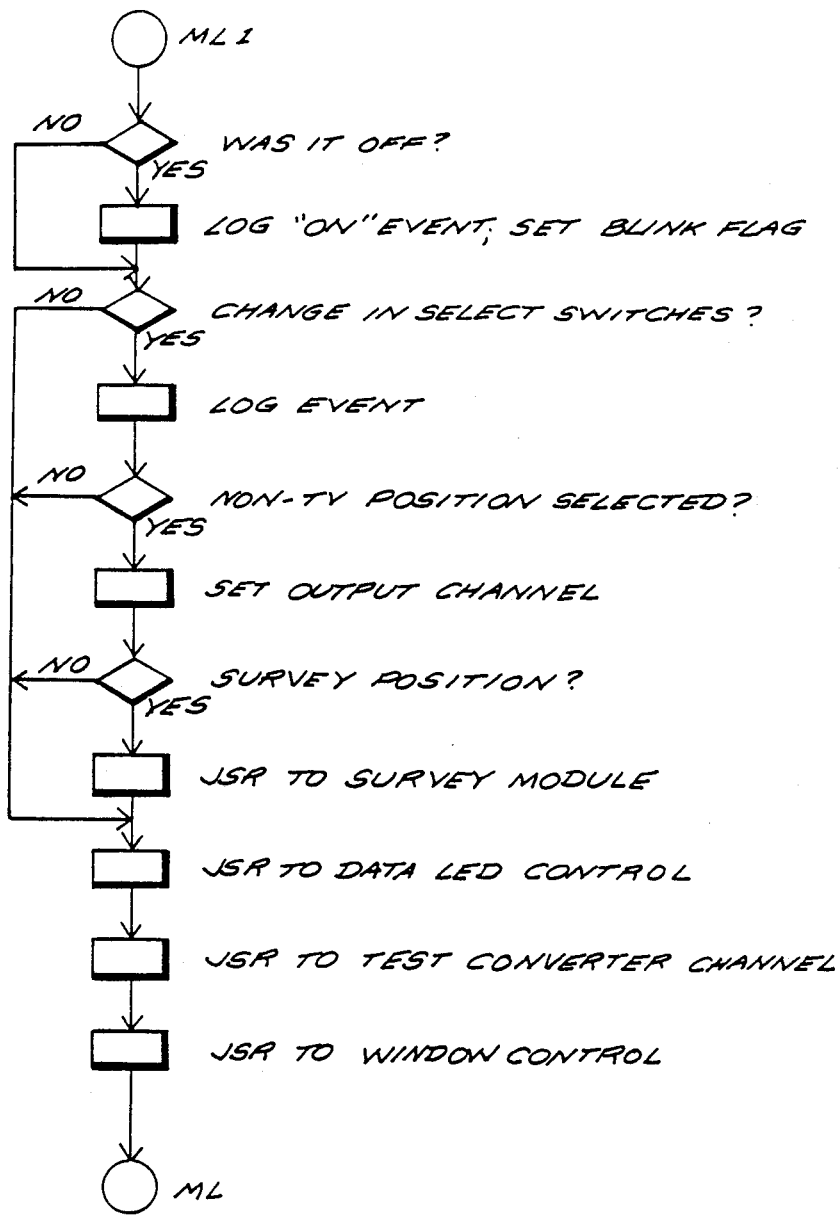
FIG. 8 is another logic flow diagram for converter control in accordance with one embodiment of the present invention.

Turning now to FIG. 8, there is shown the logic flow diagram for the main loop 1 (ML1). This loop is entered when the logic flow in FIG. 7 has a yes decision as to whether or not the converter is on. The first decision block in the loop ML1 is to whether or not the converter was off. If the converter was off, an on event is logged, and the blink flag is set (which as discussed later causes the data light emitting diode to blink). If there is a no decision to the logic block as to whether the converter was off, the logic flow is to the decision block as to whether or hot there is a change in the select switches. If there is, an event is logged and the logic flow passes to a decision block as to whether or not a non-TV position is selected. If the decision is yes, the appropriate output channel is set on the converter for whatever position is selected, i.e. computer, VCR, etc. The next decision block is to whether or not the select switches are in the survey position. If so, there is a jump subroutine (JSR) to the survey module. Next, there is a jump subroutine to data LED control, and following that a jump subroutine to test converter channel. Following that, there is a jump subroutine to window control. This window control refers to whether or not the time window permitting call in from the central location to the remote unit is open or closed. As previously discussed, advantageously a two hour window may be employed at a time when it is not expected that the telephone in the panelist's home will be in use, i.e. early in the morning hours.

Figure 9:
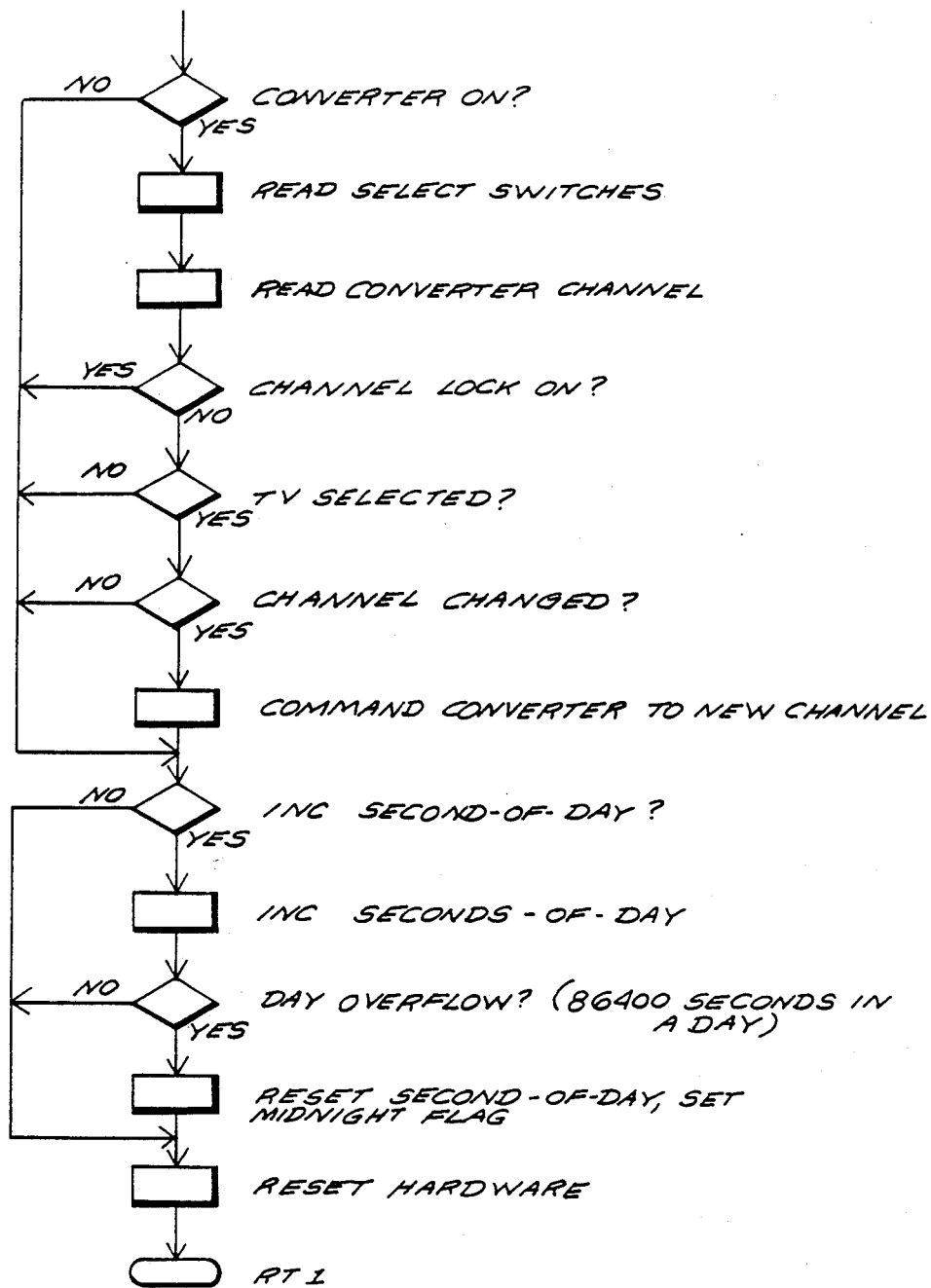
FIG. 9 is a logic flow diagram of another subroutine in accordance with the present invention.

Referring now to FIG. 9, there is shown the main subroutine for clock housekeeping and converter control. The subroutine illustrated in logic flow diagram form in FIG. 9 is interrupt driven with the rate thereof set as a system parameter. In accordance with one embodiment of the invention, the interrupt rate is nominally set for 0.1 second. The flags and values set in the subroutine illustrated in FIG. 9 are monitored by the main loop illustrated in FIG. 7. Referring now specifically to the subroutine illustrated in FIG. 9, the first decision block is to whether or not the converter is on. If the converter is on, the select switches are read and the converter channel is read. The next decision block is as to whether or not the channel lock is on. If the channel lock is not on, the next decision block is whether or not the TV is selected. If the TV is selected, the next decision block is whether or not the channel has been changed. If the channel has been changed, then the subroutine commands the converter to tune to the new channel.

The bottom portion of the logic flow diagram of FIG. 9 relates to clock housekeeping. The first decision block is whether or not there is an increment in the second of day. If there is, the subroutine executes an increment to the seconds of day value. The next decision block is as to whether or not there is a day overflow. If there is, the subroutine resets the second of day and sets a midnight flag, indicative that a day has passed. The block. labeled RT1 is an exit from this subroutine. As indicated, the subroutine is interrupt driven at a rate system parameter, which in accordance with one embodiment is nominally set for 0.1 second.

Figure 10:
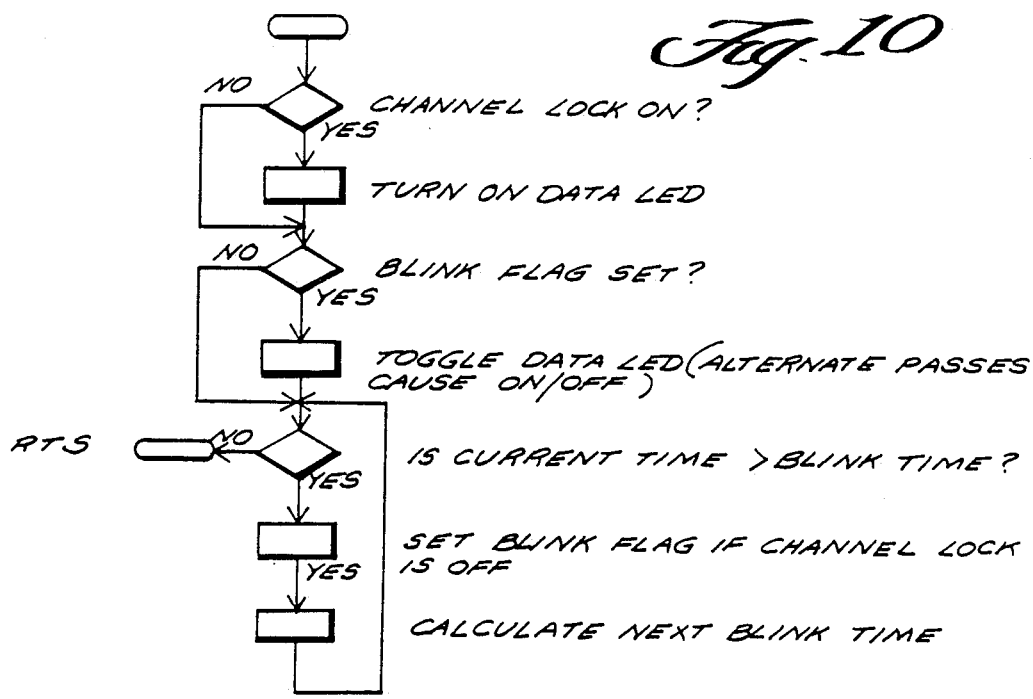
FIG. 10 is a logic flow diagram for the data LED control subroutine of one embodiment of the present invention.

Turning now to FIG. 10, there is illustrated a logic flow diagram for the data LED control module, referring to the data light emitting diode provided on the front panel of the data collection unit. This is the data LED control block illustrated in FIG. 8. In the subroutine of FIG. 10, the first decision block is as to whether or not the channel lock is on. If it is, the data LED is turned on. The next decision block is as to whether or not the blink flag is set. If it is, the data LED is toggled on and off. The next decision block is whether or not the current time is greater than the blink time. If it is not, there is an exit from the subroutine (RTS). If it is, the blink flag is set if the channel lock is off and the next blink time is calculated. The subroutine then loops back to reenter the decision block as to whether or not the current time is greater than the blink time.

Figure 11:
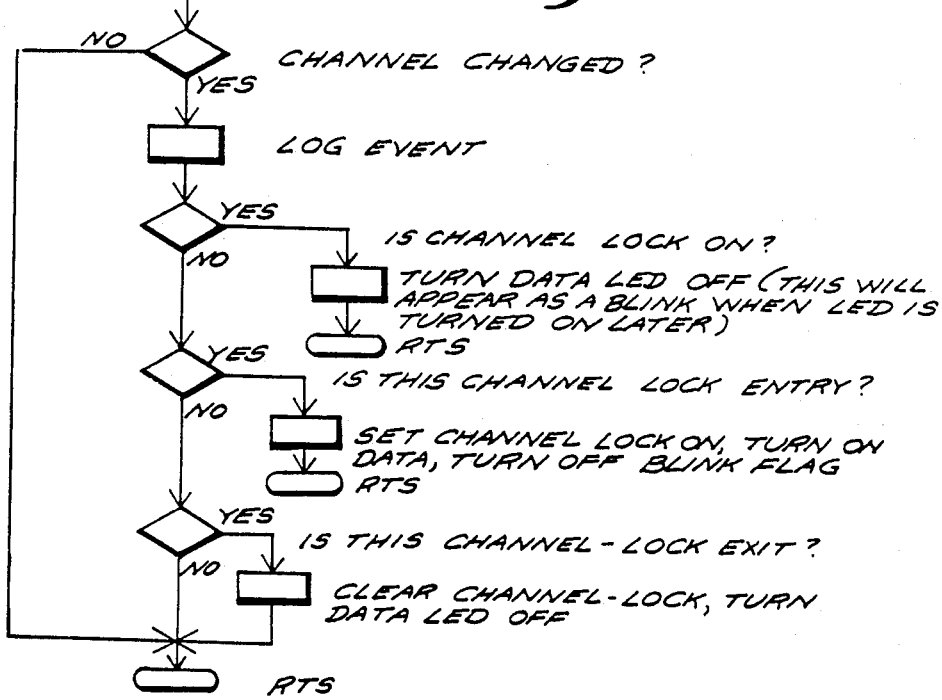
FIG. 11 is a logic flow diagram of a subroutine also relating to converter control.

Turning now to FIG. 11, there is illustrated in logic flow diagram form the subroutine relating to the test converter channel module referred to in FIG. 8. In FIG. 11, the first decision block is as to whether or not the channel has changed. If it has, an event is logged. Next decision block is as to whether or not the channel lock is on. If it is, the data LED is turned off (which will appear as a blink when the LED is turned on later) and there is an exit from the subroutine i.e. a return to start. If, on the other hand the channel lock is not on, the next decision block is as to whether or not this is a channel lock entry, i.e. has a channel been selected that corresponds to entering channel lock. If it does, the channel lock is set on, the data LED is turned on, and the blink flag is turned off and there is a return to start. If, on the other hand, this is not a channel lock entry, the next decision block is as to whether or not the channel entered is a channel lock exit. If it is, the channel lock is cleared and the data LED is turned off. If it is not a channel lock exit, there is a return to start for the subroutine.

Figure 12:
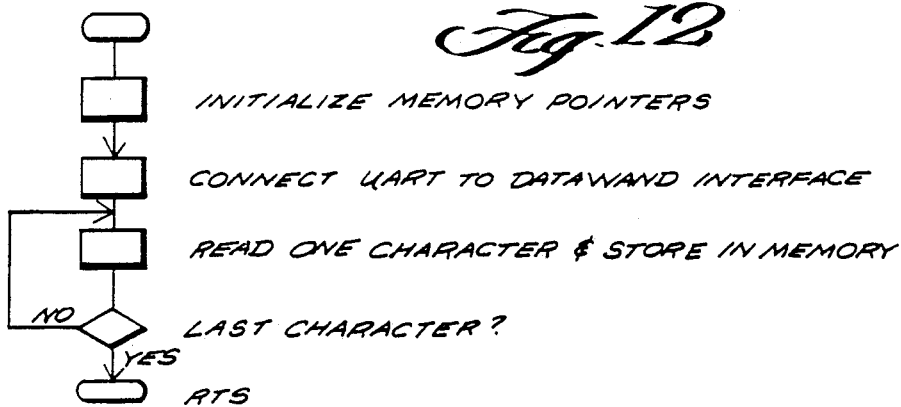
FIG. 12 is a logic flow diagram related to storing optically scanned data from a bar code reader in accordance with one embodiment of the present invention.

Turning now to FIG. 12, there is shown a logic flow diagram for the data wand read module. The first step in the logic flow is to initialize memory pointers, so that the data read in from the data wand is placed in the proper portion of the memory of the data collection unit. The next step in the logic flow is to connect the universal asynchronous receiver transmitter to the data wand interface. Characters are then read out one by one from the data wand interface and stored in memory.

Figure 13:
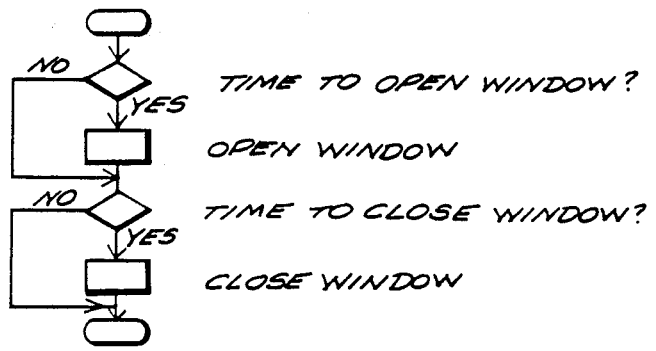
FIG. 13 is a logic flow diagram relating to control of a time window for telephone communications in accordance with one embodiment of the present invention.

FIG. 13 illustrates the logic flow for the window control module. As illustrated, the only decisions are whether or not it is time to open the window or close the window so as to permit establishing telephone communications between the data collection unit and the central location.

Figure 14:
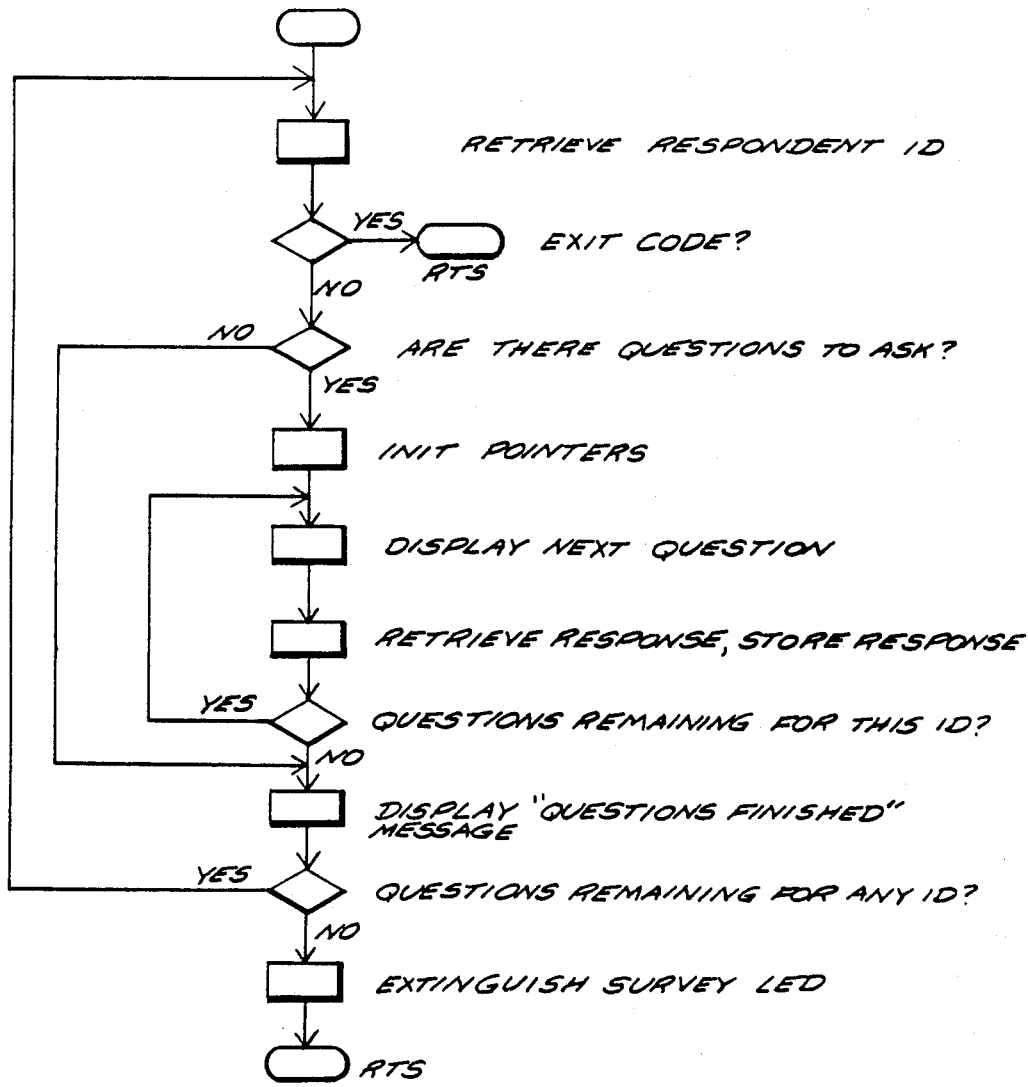
FIG. 14 is a logic flow diagram relating to the survey function of one embodiment of the present invention.

Referring now to FIG. 14, there is shown a logic flow diagram for the survey module the first step in the subroutine is to retrieve the respondent i.d. In connection with the survey function, it is useful to have different members of a panelist's household separately answer the questions in a survey. For this purpose, each of the members of the household are assigned an i.d. number. When the survey select switch is selected to enter the survey mode, the channel lock condition of the converter is automatically entered and the converter is tuned to the appropriate channel to display the survey questions. The first question presented is to ask the person answering the survey to enter his or her i.d. number, which is simply a preassigned channel number which the respondent enters. The next decision block is with respect to whether or not there is an exit code in the information coming from the survey data storage in memory. If there is, the subroutine is exited. The next decision block if there is no exit code is as to whether or not there are questions to ask. If there are, various pointers with respect to memory location and the like are initialized and the next question in the survey data is displayed. The respondent responds to the question by entering a channel number that corresponds to one of a plurality of possible answers to the question. This response is retrieved and stored in memory. The next decision block is to whether or not there are any questions remaining for this i.d., i.e. whether or not this particular member of the household has further questions which need to be answered. If there are, the next question is displayed, the response retrieved and stored, and so on. If there are no questions remaining for this particular respondent, a "questions finished" message is displayed. The next decision block is to whether or not there are questions remaining for any i.d., that is, whether or not there are further survey questions for any other members of the panelist's household. If there are not any further questions remaining for any i.d., the survey light emitting diode is extinguished. As previously discussed, this survey light emitting diode on the front face of the data collection unit is illuminated whenever there are any unanswered survey questions in memory.

Figure 15:
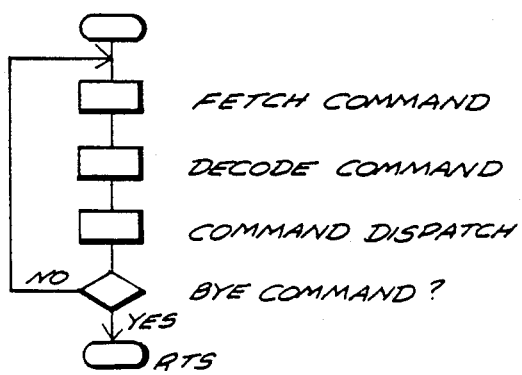
FIG. 15 is a logic flow diagram for a communication subroutine in accordance with one embodiment of the present invention.

Turning now to FIG. 15, there is illustrated a logic flow diagram with respect to the communication module. The first step in the subroutine is a fetch command, which is simply a receipt of a character stream. The character stream is decoded, and the command dispatch step involves referencing the place in the memory corresponding to the decoded command, and execution of the relevant further commands stored at that location in memory. The final decision block in this subroutine is as to whether or not there is-a bye command. That is, at the end of the character stream an entry signaling that it is the end of the character stream is inserted, and this decision block decides whether or not the communication is ended.

Polling the data collection units from a central location using telephone lines and modems may not always be the best technique for retrieving stored data from the memories of the data collection units. For example, there are markets where the incidence of private household telephones is small. As another example, there may be some applications in which assembled and analyzed market research data is not needed until a fairly long time interval after the raw data is collected. For these kinds of applications, a different embodiment of the present invention has been developed which uses a portable data collector for collecting data from the data collection unit.

This alternate embodiment is illustrated in block diagram form in FIG. 17. The system as shown in FIG. 17 is somewhat similar to the system shown in FIG. 1, and like system components in the two drawings are identified by the same reference numerals. The data collection unit 21' shown in FIG. 17 can be almost the same data collection unit 21 as referred to previously, with the difference that the modem is eliminated from the data collection unit and an external electrical connector (reference numeral 100 in FIG. 17) is instead provided. Also, in the system shown in FIG. 17 the telephone block and switched telephone network are not utilized; that is, there are no telephone connections. Instead of daily transfers of data from the RAM memory of the data collection units to a central computer via telephone, data simply accumulates in the RAM. Periodically, such as once every week or every two weeks, a "meter reader" visits each panelist household with a protable-data collector 101. The portable data collector is simply a digital data recorder including a microprocessor with associated operating ROM and RAM and storage medium, such as magnetic cassette tape or disc. The ROM holds all the executable code required to enable the device to communicate with the data collection units and the RAM is used to buffer data extracted from the data collection units. Such devices are commercially available, and one suitable device is available from Pegasus Data Systems of Middlesex, N.J. and identified as Buffered Digital Data Recorder Model PDI-BF. That particular device utilizes a magnetic cassette tape. In operation, the portable data collector is simply connected to the external electrical connector 100 of the data collection unit 29'. The microprocessor in the portable data collector is suitably programmed to input the appropriate signals and commands to the data collection unit for transfer of the data stored therein to the portable data collector. These are simply the same commands as would be given the data collection unit by a central computer over telephone lines in the earlier described embodiment and, for example, would include commands of retrieve data collection unit status, retrieve event data, clear data collection unit data area, reset data collection unit clock (if required), and resume normal data collection unit activity.

The portable data collection unit is used to play back the recorded data from the data collection units to the central computer 24 as illustrated in FIG. 17. The data collection unit serial numbers, which are written onto the tape or disc of the portable data collector along with the data, permit the central computer to identify which particular panelist household corresponds to each block of data recorded in the portable data collection unit.

Instead of a digital data recorder as referred to above, the portable data recorder may be a suitable programmed minicomputer or the like, with data extracted from the data collection unit written onto a floppy disc.

One of the advantageous features of the remote data collection units in accordance with the present invention is the ability to collect data defining the composition of the television viewing audience in each panelist household. As explained previously, one way of achieving this in the present invention is to use the channel selector to cause the cable converter or tuner to enter a channel-lock condition. When in the channel-lock condition, the data collection unit disables normal channel tuning so that the channel selector can be used to enter numbers which are stored in the data collection unit memory. Each member of the panelist household is assigned a viewer identification number. These viewer identification numbers are entered into the data collection unit via the channel selector to indicate which members of the panelist household are in the room. While viewers are allowed to enter viewer identification numbers at any time, in an effort to remind viewers to enter the viewer identification numbers, the data collection unit will periodically issue a prompt.

In one version of a data collection unit, a viewer identification prompt is implemented using the light emitting diode 33 labeled "data." When viewer identifications are required, the data collection units flashes the light emitting diode on and off at a rate of once per second. When viewers see the flashing light emitting diode 33, they are expected to enter channel-lock and enter their viewer identifications via the channel selector. Entering channel-lock causes light emitting diode 33 to stop flashing and be illuminated continuously. Each time a viewer identification number is entered, the light emitting diode 33 will blink off for half a second to indicate to the viewer that the identification number has been accepted by the data collection unit. When all the viewer identification numbers have been entered, the channel-lock mode is exited, and light emitting diode 33 is extinguished.

In accordance with another embodiment of the present invention, viewer identification data is obtained in a somewhat different manner. As has been previously explained, in accordance with one embodiment of the present invention the data collection unit includes hardware and programming which permits presentation of text and graphics on the television receiver to which it is connected. This arrangement can be used to implement the Survey function of the data collection unit. In accordance with one arrangement of the present invention, and referring to FIG. 16, a technique is implemented to have the viewer identification prompt appear on the television screen itself, no matter what channel is selected.

In FIG. 16 a video generator 91 is provided which communicates with and reads the contents of a RAM 92 and produces a video output. The RAM 92 can be part of the RAM 39 illustrated in FIG. 5 and the video generator 91 can be part of the video interface 49 illustrated in FIG. 5. In both the Survey mode and the viewer identification sequence, the contents of the video data stored in RAM 92 are read as lines of 8 bit ASCII characters. The output of video generator 91 is passed through an RF modulator 93 which is, in effect, a small TV transmitter that sends a picture displaying the characters stored in the RAM 92. The carrier frequency for this signal is fixed to be identical to that of the output of the cable converter, which is usually channel 3.

In accordance with the embodiment of the present invention which uses a cable converter, the cable converter converts all incoming television signals to a single output channel, for example, channel 3. A small receiver 94 is used to demodulate this RF signal and extract the vertical sync pulse. This pulse is fed into a synchronizer circuit 96, which starts the RF modulator 93 and video generator 91. The. RF signal from RF modulator 93 is presented to a switch 97. The switch 97 is a suitable electronic switch for high speed switching of an RF signal. This switch selects the RF signal from either the cable converter or the RF modulator 93 and directs the selected signal to the television receiver.

Switch 97 is controlled by a switch control circuit 98. This switch control circuit 98 detects the border that appears around the area on the television screen where the text is written. The signal level change that occurs at the left edge of a screen of text is a trigger causing the switch control circuit 98 to set the switch 97 to select the output of RF modulator 93. The switch control circuit can also detect the transfer of a byte of data in which all the bits are set (i.e. hexadecimal FF) from the RAM 92 to the video generator 91. The detection of a data byte with all bits set causes the switch control circuit 98 to reset switch 97 to select the converter output.

The text can appear anywhere on the television screen. Each line of text is displayed until the end of the line or until a byte containing hexadecimal FF is read from the RAM 92. If a text line is not to be displayed, the byte corresponding to the first character of that line is set to hexadecimal FF. Full lines or portions of lines can be switched. The overall effect is that of lines of characters being displayed over the picture from the cable converter.

The microprocessor controls this display via the RAM 92 and an overlay enable line 99. The microprocessor first loads RAM 92 with the characters to be displayed and bytes of hexadecimal FF to define areas of the screen that are to remain unaffected. When the microprocessor sets the overlay enable line 99, the text is displayed over the normal picture. The overlayed text is removed when the microprocessor clears the overlay enable line.

In accordance with a particular embodiment of the present invention, the viewer identification, prompting signal takes the form of two flashing symbols (such as ) in the upper left portion of the television screen. When the data collection unit requests viewer identifications, the two symbols () appear on the screen and blink continuously back and forth between two colors at a rate of once per second. These symbols continue to flash until a viewer causes the data collection unit to enter the channel-lock mode. When the data collection unit enters channel-lock, the symbols stop flashing and the overlay on the television screen is the following:

```
** 2 4 6 8 10 12 14 16 18 71 72
   PRESENCE OF GUEST   ML FM
```

Each of the numbers 2 to 18 corresponds to a valid viewer identification for a member of the panelist household. The purpose of the special identification numbers 71 and 72 is explained hereafter.

Each time a viewer identification number is entered, the corresponding number in the display shown above is inverted in color to indicate to the person entering the data that the data collection unit has accepted that input. Should a number that is already inverted on the display be entered, that number on the display reverts to its normal color. Thus, multiple entries of the same number will cause the number on the display to toggle back and forth between normal color and inverted color. This allows the person entering the data to change a particular viewer identification entry should that be required.

The special viewer identification numbers 71 and 72 are used to indicate the presence of male and female guests, respectively. If a 71 is entered as a viewer identification number, the following three line display appears as an overlay on the television screen:

```
ML  GUEST  COUNT  BY AGE  2-6:
7-11:    12-17:      18-24:    25-34:
35-49:   50-54:      554:
```

This is a request for the number of male guests in each of the age categories that are present in the room. In accordance with a preferred embodiment of the present invention the channel selector includes a scan up and scan down control ordinarily used to scan television programming. When in the viewer identification mode, this scan control can be used to position or move a cursor on the television screen to "pump" among the various categories displayed in response to entry of the special viewer identifications numbers. Entry of a number through the channel selector while the cursor is positioned at one of the categories is an indication of the number of guests in the specified age categories presented in the room.

In a similar manner, entry of the viewer identification number 72 produces an overlay on the television screen with corresponding age categories and directed to female guests present in the room. When the composition of the complete viewing audience has been specified, the person entering data can exit from the channel-lock condition and the display overlay is removed from the screen.

Upon subsequent entries into the channel-lock condition, the text overlays on the television screen are presented with the audience composition information displayed as it was defined the previous time that viewer identification data was entered. If the audience has not changed, this can be signified by merely entering and exiting channel-lock. If the audience has changed, the channel selector and scan control can be used to change any entries that are no longer connected.

In accordance with a preferred embodiment of the invention, the viewer identification prompt is first issued when the television set is turned on. The viewer identification prompt is also presented whenever a 30 minute period passes with no viewer identification data being entered. In this manner, a complete account of audience composition is recorded by the data collection unit on a current basis for the programming being viewed on the television set.

Although the present invention has been described and illustrated with respect to preferred and exemplary embodiments thereof, it should be clear that various modifications are within the skill of those in this art, without departing from the true spirit and scope of the invention.

We claim:

1. A system for collecting data with respect to cooperating television viewers or panelists at a plurality of panelist locations, said system including a central computer and a plurality of remote units at the corresponding plurality of panelist locations, each remote unit comprising:
   a television display screen;
   a television signal source having a plurality of channels of programming;
   viewer control means including at least a means for selecting one of said channels of programming for display on said television display screen;
   data collecting means including a microprocessor and memory means for storing programming information for said microprocessor and for storing data, said means in said viewer control means for selecting one of said channels being monitored by said microprocessor which stores in said memory means data representing the channels selected for display;
   means under control of said microprocessor in said data collecting means for initating at the remote locations on-screen prompts overlayed on normal programming on said television screen inquiring as to the identity of persons viewing the television screen at the time of the prompts; and
   said viewer control means also including a means for entering viewer identity data into said memory means in response to the on-screen prompts.

2. A system in accordance with claim 1 wherein said means in said viewer control means for selecting one of said channels of programming for display comprises a channel selector associated with said television display screen.

3. A system in accordance with claim 1 including means for periodically establishing telephone communications between the central computer and each of the units for transferring stored data with respect to the data representing the channels selected for display and the viewer identity data back to the central computer.

4. A system in accordance with claim 1 including optical scanning means at each of the remote locations for use by a panelist to scan data, the scan data being stored in said memory means.

5. A method of collecting data from a plurality of cooperating panelists at a plurality of remote locations comprising the steps of:
   providing at each remote location a television display screen, a television signal source having a plurality of channels of programming, and viewer control means including at least a means for selecting one of said channels of programming for display on said television display screen;
   providing at each remote location data collecting means including a microprocessor and memory means for storing programming information for said microprocessor and for storing data, monitoring the means for selecting one of said channels in the viewer control means by the microprocessor and storing in the memory means data representing the channels selected for display;
   initiating at the remote locations under control of the microprocessor on-screen prompts overlayed on normal programming on the television screen inquiring as to the identity of persons viewing the television screen at the time of the prompts; and
   providing the viewer control means with a means for entering viewer identity data into the memory means in response to the of screen prompts.

6. A method in accordance with claim 5 including the steps of providing a centrally located computer and periodically establishing telephone communications between the centrally located computer and each of the data collecting means for transferring stored data with respect to the channels selected for display and the viewer identity data back to the central computer.

7. A method in accordance with claim 5 including the step of providing an optical scanner at each of the remote locations for use by a panelist to scan data, storing data scanned by the optical scanner in the memory means, and transferring the scanned data along with the stored data with respect to the channels selected for display and the viewer identity data in telephone communications with the centrally located computer.

8. A remote television audience identification and channel selection determination apparatus comprising;
   a television signal source comprising a plurality of channels of television programming;
   a television set having a display screen connected to said television signal source;
   means for selecting one of said plurality of channels for display on said display screen;
   means for determining and storing channel selection data representative of which of said plurality of channels has been selected for display;
   means for overlaying over normal programming on said display screen prompts inquiring as to the identity of viewers watching the screen at the time of said prompts;
   means adapted to permit a television audience member to respond to said prompts by entering audience identification data;
   means for receiving and storing said audience identification data; and
   means for communicating the stored channel selection and audience identification data to a central location.

9. Apparatus according to claim 8 further including means for scanning universal product codes and for storing universal product code data, and wherein said means for communicating data to a central location further includes means for communicating the stored universal product code data to said central location.

10. Apparatus according to claim 8 further including optical scanning means for optically reading codes and for storing optical data representative thereof, and wherein said means for communicating data to a central location includes means for communicating the stored optical data to said central location.

* * * * *